United States Patent
Zhang et al.

(10) Patent No.: US 10,210,272 B1
(45) Date of Patent: Feb. 19, 2019

(54) WINDOW QUERY MONITORING FOR MOBILE DEVICES AND CENTRAL DATABASE SERVERS WITH A TREE-LIKE INDEX

(71) Applicants: Mingjin Zhang, Miami, FL (US); Naphtali Rishe, Miami Beach, FL (US); Jahkell Lazarre, Miami, FL (US)

(72) Inventors: Mingjin Zhang, Miami, FL (US); Naphtali Rishe, Miami Beach, FL (US); Jahkell Lazarre, Miami, FL (US); Tao Li, Coral Gables, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/822,667

(22) Filed: Nov. 27, 2017

(51) Int. Cl.
*G06F 17/30* (2006.01)

(52) U.S. Cl.
CPC .... *G06F 17/3087* (2013.01); *G06F 17/30961* (2013.01); *G06F 17/30061* (2013.01); *G06F 17/30241* (2013.01); *G06F 17/30333* (2013.01); *G06F 17/30554* (2013.01)

(58) Field of Classification Search
CPC .......... G06F 17/30241; G06F 17/3087; G06F 17/30061; G06F 17/30333; G06F 17/30554; G06F 17/3002; G06F 17/30321; G06F 17/30327
USPC ....... 707/724, 708, 725, 743, 758, 769, 770, 707/918, 919, 920
See application file for complete search history.

(56) References Cited

U.S. PATENT DOCUMENTS

| | | | | |
|---|---|---|---|---|
| 8,346,751 B1* | 1/2013 | Jin | ..................... | G06F 17/30241 707/708 |
| 8,589,069 B1* | 11/2013 | Lehman | ................. | G01C 21/20 340/995.1 |
| 9,009,177 B2* | 4/2015 | Zheng | ............... | G06F 17/30241 707/758 |
| 2010/0114905 A1* | 5/2010 | Slavik | ............... | G06F 17/30241 707/743 |
| 2012/0158762 A1* | 6/2012 | Iwuchukwu | ...... | G06F 17/30241 707/759 |
| 2013/0219308 A1* | 8/2013 | Britton | .................. | G06F 3/0488 715/764 |
| 2015/0370828 A1* | 12/2015 | Maurer | ............. | G06F 17/30061 707/722 |
| 2016/0076901 A1* | 3/2016 | Cho | ....................... | G01C 21/26 701/533 |

(Continued)

OTHER PUBLICATIONS

Nutanong et al., "The v* -diagram: a query-dependent approach to moving KNN queries," Proceedings of the Very Large Data Bases Endowment, Aug. 2008, pp. 1-12.

(Continued)

*Primary Examiner* — Dangelino N Gortayo
(74) *Attorney, Agent, or Firm* — Saliwanchik, Lloyd & Eisenschenk

(57) ABSTRACT

Systems and methods for performing a mobile window query are provided. A method can include transmitting a mobile window query, determining which interest point falls within a query window, defining a potential safe region, refining the safe region utilizing the surrounding interest points, and returning the interest points and safe region to a user.

20 Claims, 30 Drawing Sheets

(56) References Cited

U.S. PATENT DOCUMENTS

2016/0283516 A1* 9/2016 Barnes .............. G06F 17/30241

OTHER PUBLICATIONS

Li et al., "Processing moving kNN queries using influential neighbor sets," Proceedings of the Very Large Data Bases Endowment, Oct. 2014, pp. 113-124, vol. 8, No. 2.

Cheema et al., "Continuous monitoring of distance based range queries," Transactions on Knowledge and Data Engineering, Aug. 2011, pp. 1-16.

Hasan, "Efficient algorithm to monitor continuous kNN queries," International Journal of Advances in Computer Science and Technology, Apr. 2013, pp. 36-47, vol. 2, No. 4.

Nutanong et al., "Analysis and evaluation of V*-kNN: An efficient algorithm for moving kNN queries," The International Journal on Very Large Data Bases, Jun. 2010, pp. 1-25.

Hasan et al., "Efficient construction of safe regions for moving kNN queries over dynamic datasets," International Symposium on Spatial and Temporal Databases, Jul. 2009, pp. 1-6.

Zhang et al., "Location-based spatial queries," Proceedings of the 2003 ACM SIGMOD International Conference on Management of Data, Jun. 2003, pp. 1-12.

Al-Khalidi et al., "Monitoring moving queries inside a safe region," The Scientific World Journal, Feb. 2014, pp. 1-13.

Al-Khalidi et al., "On finding safe regions for moving range queries," Mathematical and Computer Modelling, Sep. 2013, pp. 1449-1458, vol. 58.

Al-Khalidi et al., "Efficient monitoring of moving mobile device range queries using dynamic safe regions," Proceedings of International Conference on Advances in Mobile Computing and Multimedia, Dec. 2013, pp. 1-10.

Tao et al., "Time-parameterized queries in spatio-temporal databases," Proceedings of the 2002 ACM SIGMOD International Conference on Management of Data, Jun. 2002, pp. 1-12.

* cited by examiner

| | Fig. | Comment | Queue | LH | UH | RH | DH | Uncovered |
|---|---|---|---|---|---|---|---|---|
| 1 | 5A | Initialization | R | | | | | |
| 2 | 5B | Expand R | N1-N3 | | | | | |
| 3 | 5C | Expand N1-N3 | N4-N12 | | | | | |
| 4 | 5D | N6 fully covered<br>Expand N8,N10,N12<br>Rest are uncovered | IP1-IP9 | N6 | N6 | N6 | N6 | N5,N11,N4,N9,N7 |
| 5 | 5E | IP2,IP5 fully covered<br>Rest are uncovered<br>Output Window Query result | IP1-IP9 | IP5,N6,IP2 | IP2,N6,IP5 | IP2,N6,IP5 | IP5,N6,IP2 | N5,IP6,IP9,IP8,N11,N4,IP1,<br>IP3,N9,IP4,IP7,N7 |
| 6 | 7B | Expand N5 | | IP5,N6,IP2 | IP2,N6,IP5 | IP2,N6,IP5 | IP5,N6,IP2 | IP6,IP10,IP9,IP8,N11,N4,IP1,<br>IP3,IP12,N9,IP11,IP4,IP7,N7 |

WINDOW QUERY MONITORING FOR MOBILE DEVICES AND CENTRAL DATABASE SERVERS WITH A TREE-LIKE INDEX

STATEMENT OF GOVERNMENT SUPPORT

This invention was made with government support under Grant No. U.S. Pat. No. 1,213,026 awarded by National Science Foundation. The government has certain rights in the invention.

BACKGROUND

The rising popularity of location-based services (LBS) is attributed to the high availability of inexpensive Global Position Systems (GPS), network bandwidth, and mobile devices with expanded storage and increased processing power. Mobile clients frequently use LBS applications to perform spatial queries based on their current locations. A popular type of spatial query is a window query. The query is sent to a server to process and the server returns the result to the client. However, a change in the client's position can invalidate the result.

In the prior art, as the client moves, the query must be continuously reposted to the server to compute and retrieve updated results, incurring high network usage and processing costs. In order to make query processing more efficient, the frequency at which these spatial queries are posted to servers must be reduced. Mobile Window Query (MWQ), also known as Moving Window Query, is defined as the retrieval of a query result along with a safe region. As long as the user stays within the safe region, the mobile client does not need to post another query. The query does not have to be reposted to the server, until the client's position is outside of the safe region.

BRIEF SUMMARY

Embodiments of the subject invention provide systems and methods for efficiently processing mobile window queries. Methods can be designed to transmit a window query from a mobile device to a remote server. The remote server can return local interest points such as restaurants, products, and gas stations, as well a safe region within the query window. The safe region is an area that enables the user to move within the safe region without reposting a new window query until such time that the user has left the safe region. The method enables devices and remote servers to efficiently process window queries reducing the query request frequency to the server and improving the computing efficiently at the servers while using location based services.

Embodiments of the subject invention also provide systems and methods for efficient window query with localized location based devices when services provided not in the typical client-server model. For example, standing alone navigation systems can have limited primary storage and processing power, rendering infeasible the computation of window query results whenever the device moves. The safe region eliminates the need to reprocess window queries whenever the device moves as the query results are guaranteed not to change. Examples are provided to describe real world uses of the systems and methods described herein.

DETAILED DESCRIPTION

Embodiments of the subject invention provide methods and systems for efficient mobile window query processing by: (1) computing a potential safe region and the corresponding candidate influence objects (i.e., interest points, IP); and (2) refining the potential safe region return an actual safe region and the corresponding set of interest points. In contrast to prior art methods, such as Zhang (2003), the methods described herein only need to visit a small subset of the nodes and perform a relatively small number of comparisons and only need to traverse a tree like index type. In summary, methods and systems described herein greatly improve query efficiency, which is critical for today's large-scale location-based service systems.

Figure 1:
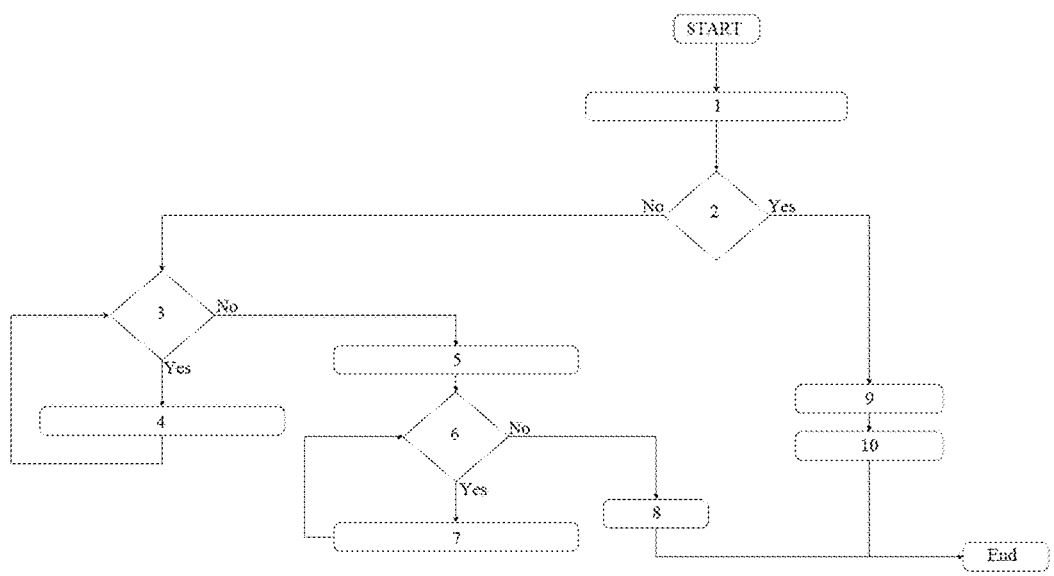
FIG. 1 is a diagram of workflow of a Mobile Window Query according to an embodiment of the subject invention.

A process flow describing transmission of a window query to returning interest points and an actual safe region can be seen in FIG. 1, according to certain embodiments of the subject invention. The process begins with a user submitting a window query through a smart phone, tablet, or another location cognizant device to a. Step 1 can be to calculate the initial window query result by traversing a tree like index. The root of the tree can be pushed into a queue. The process determines which nodes completely fall within the window query. The nodes that are fully covered by the query window are inserted into directional heaps. Nodes that are partially covered by the query window can be expanded and the objects contained in the node that are covered by the window query can be pushed into the queue. Nodes that are not covered by the window query can be inserted into an uncovered heap. These steps can be repeated until the queue is empty. Step 2 can be to determine whether the window query is empty. If the window query is empty a next step can be to find a nearest interest point, calculate a conservative safe region (step 10) and return the results to the user's smartphone, tablet or mobile device. If the window query is not empty, step 3 can be to determine if there an unmarked heap in the directional heaps. If there are unmarked directional heaps, step 4 can be to calculate a potential safe region. A potential safe region can be calculated by iteratively popping nodes from the directional heaps and inserting the non-leaf nodes back into the directional heaps to reveal the leaf nodes that are contained within the heap and covered by the window query. The potential safe region is determined by determining the direction and distance between the leaf closest to a side of the window query and expanding the potential safe region a distance equal to the minimum distance between the leaf and the window query side in direction opposite to said window query side. Step 5 can be to use the Step 4 revealed closest distances to each side of the query window and construct a potential safe zone. Step 6 can be a determination of whether there are any nodes in the uncovered heap. If there are no nodes in the uncovered heap step 8 can be to return the actual safe region which is equivalent to the potential safe region. If there are nodes in the uncovered heap, then step 7 can be to remove the node from the uncovered heap, and expanding the node to reveal any objects contained within the node and calculating a Minkowski. If the node's Minkowski sum intersects the safe region and it is an internal node, expand it, and insert its children into the uncovered heap. If there is an intersection between the Minkowski sum and the potential safe region, and the node is a leaf node, refine the potential safe region by subtracting the area of the intersection from the potential safe region. As described earlier step 8 can be to return the actual safe region to user's mobile phone, tablet or other mobile device. In this step, a conservative safe region is constructed for the case that there is no interest point inside the query window.

A visual example of the foregoing workflow steps can be seen in FIGS. 5A-5E, 6A-6E, and 7A-7O. The contents of data structures for FIGS. 5A-5E and 7B are explained in FIG. 8. A query point q can be a tuple of coordinates that can represent an object in physical or virtual multidimensional space, for example: a person, an animal, a car, a plane, a smartphone, or a drone. Each interest point, IP, may represent an object of same or different type than that of other interest points. Every interest point can be a stationary object, for example: a gas station, police station, restaurant, hotel, or an objective in a videogame. The query window is centered at query point q. In computational geometry, the Minkowski sum of two sets of position vectors in Euclidean space can be constructed by adding each vector in the first set to each vector in the second set.

Figure 5A:
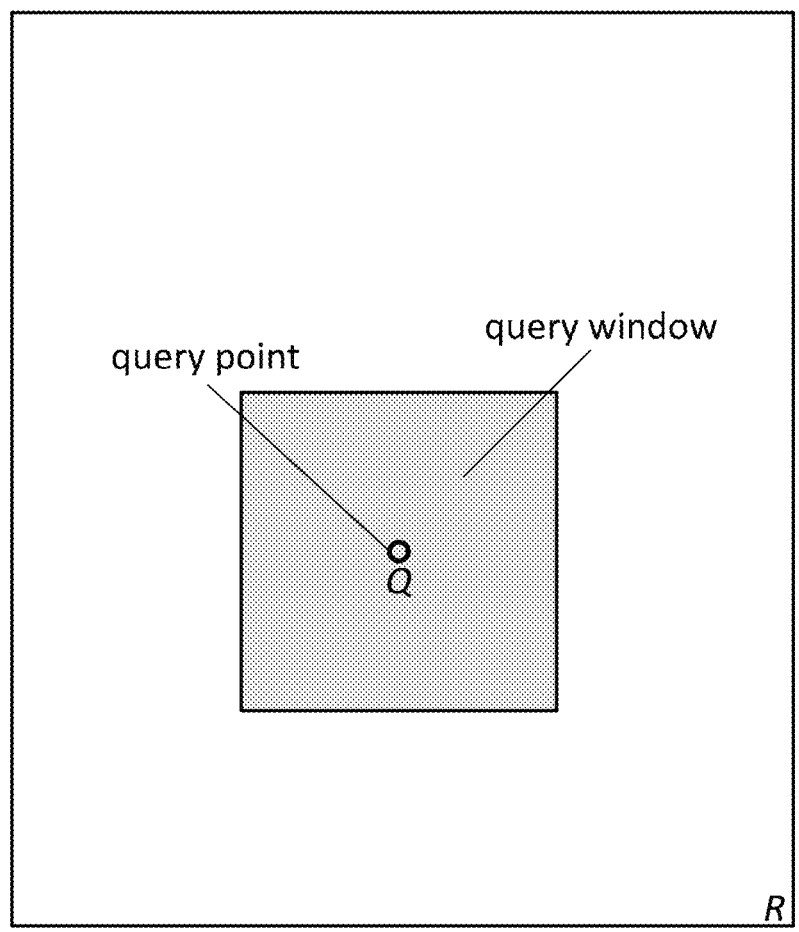
FIG. 5A is a diagram of a query point and it's query window, intersecting the top node of a tree-like index structure.
Figure 5B:
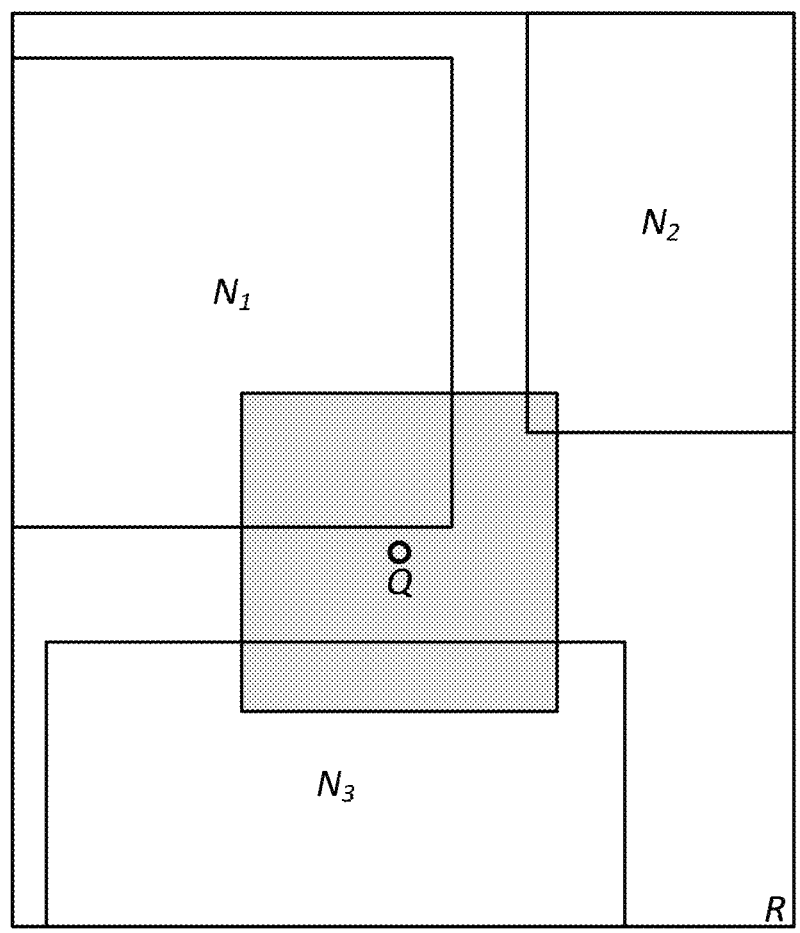
FIG. 5B is a diagram of a query window intersecting expanded children nodes $N_1$, $N_2$ $N_3$.
Figure 5C:
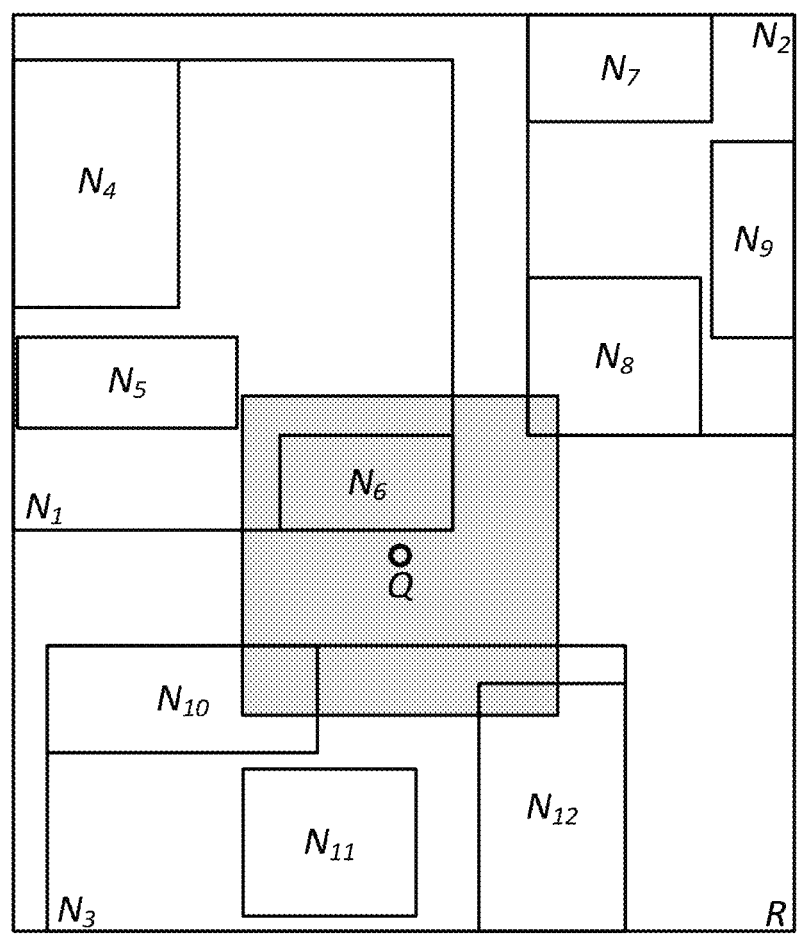
FIG. 5C is diagram illustrating nodes $N_1$, $N_2$, and $N_3$ intersecting the query window and having been expanded to reveal nodes $N_4$-$N_{12}$.
Figure 5D:
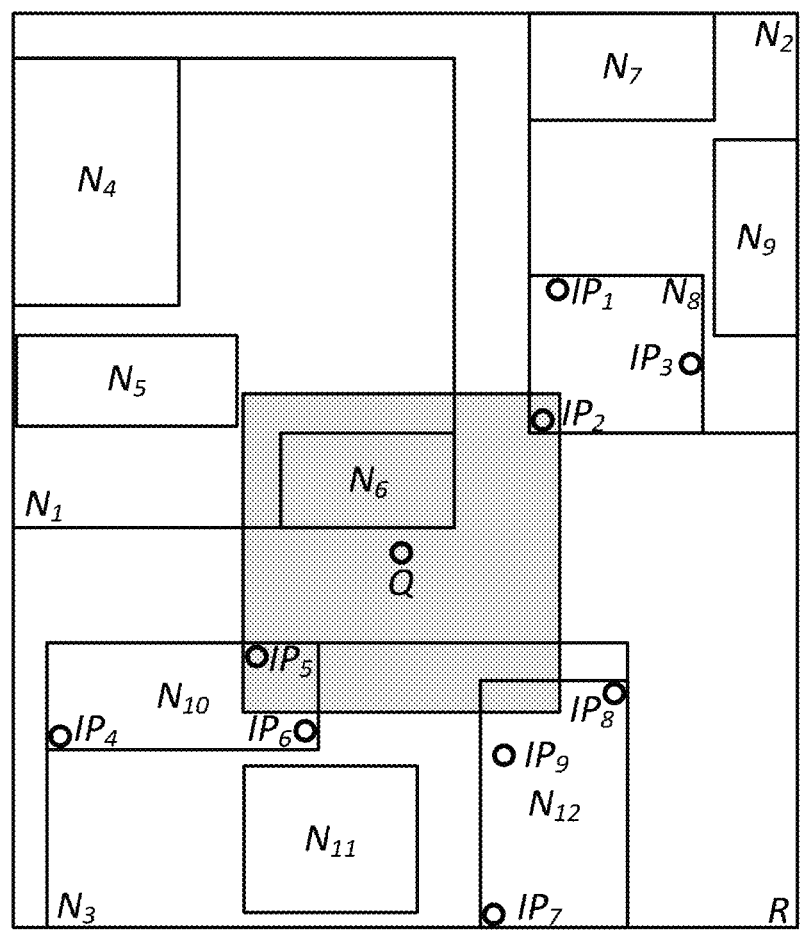
FIG. 5D is a diagram illustrating nodes $N_8$, $N_{10}$, and $N_{12}$ intersecting the query window and having been expanded to reveal interest points $IP_1$-$IP_9$.
Figure 5E:
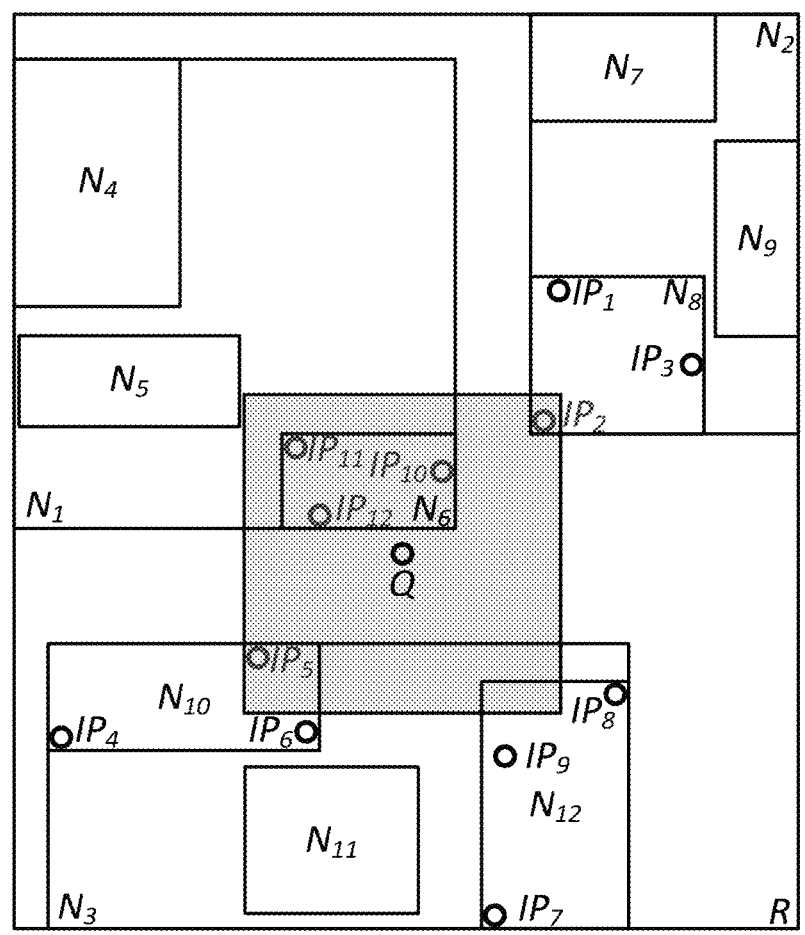
FIG. 5E is a diagram depicting that $IP_2$, $IP_5$, and $IP_{10}$-$IP_{12}$ are within the window query.

A MWQ can be posted to a server in a client-server model. The root node R of the tree-like index is retrieved and is shown along with the window in FIG. 5A. R can be pushed into a queue and R can be popped from the queue. Since the query window partially covers R, R is expanded, as seen in FIG. 5B, and its children ($N_1$-$N_3$) are inserted into the queue. As seen in FIG. 5C, the query window only partially intersects the nodes in the queue, so they are all popped and expanded, and their children ($N_4$-$N_{12}$) are inserted into the queue. After the next round of popping nodes the queue, nodes $N_4$, $N_5$, $N_7$, $N_9$, and $N_{11}$ can be inserted into the uncovered heap since they do not intersect with the query window. Node $N_6$ can be inserted into the directional heaps because it is fully covered by the query window. Nodes $N_8$, $N_{10}$, and $N_{12}$ are expanded, as seen in FIG. 5D, and its children, which are all leaf nodes, are pushed into the queue because they are partially covered by the query window.

After the next round, leaf nodes $IP_1$, $IP_3$, $IP_4$, $IP_6$, $IP_7$, $IP_8$, and $IP_9$ can be inserted into the uncovered heap, and leaf nodes $IP_2$ and $IP_5$ can be inserted into the directional heaps. The queue is now empty. With respect to the directional heaps, $N_6$ is the node in the query window that is closest to the left border of the window. IP5 is the closest node to the left border. The minimum value in a heap is the maximum value in the heap that represents the opposite direction, and vice versa. Similarly, $IP_2$ is the closest node in the window that is closest to the window's top border, which means it is furthest from the bottom border.

The top with the minimum key is $IP_5$ in the Left-Heap (it is closest to its respective border compared to the top nodes in the other directional heaps), so it can be processed first. Since $IP_5$ is a leaf node, the Left-Heap is marked as done. The top with the minimum key is $IP_2$ in the Right-Heap, so it can be processed next. Since it is a leaf node, the Right-Heap is also marked as done. The top with the minimum key is now $IP_2$ in the Up-Heap, so it can be processed next. It is also a leaf node, so the Up-Heap is marked as done. The same holds for the Down-Heap whose top is leaf node $IP_5$. The directional heaps are all marked as done, so the bounded initial candidate safe region can be computed.

Figure 6A:
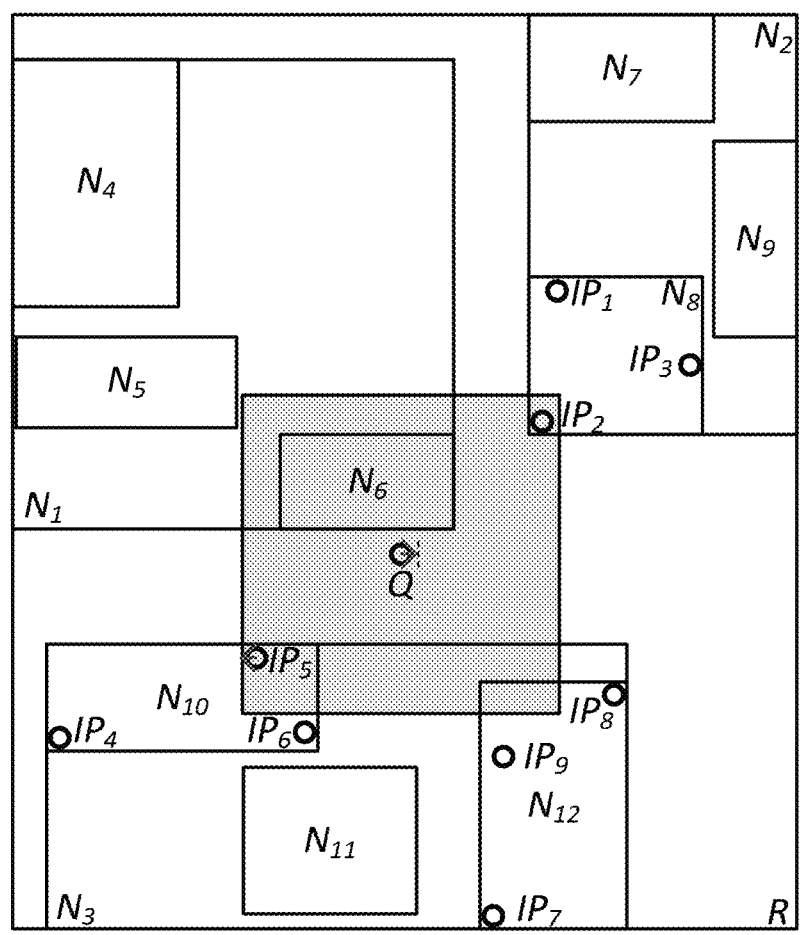
FIG. 6A is a diagram illustrating that the right side of a potential safe region will be an equal distance to the query point, Q, as the distance of the closest node, $IP_5$, is to the left side of the query window.
Figure 6B:
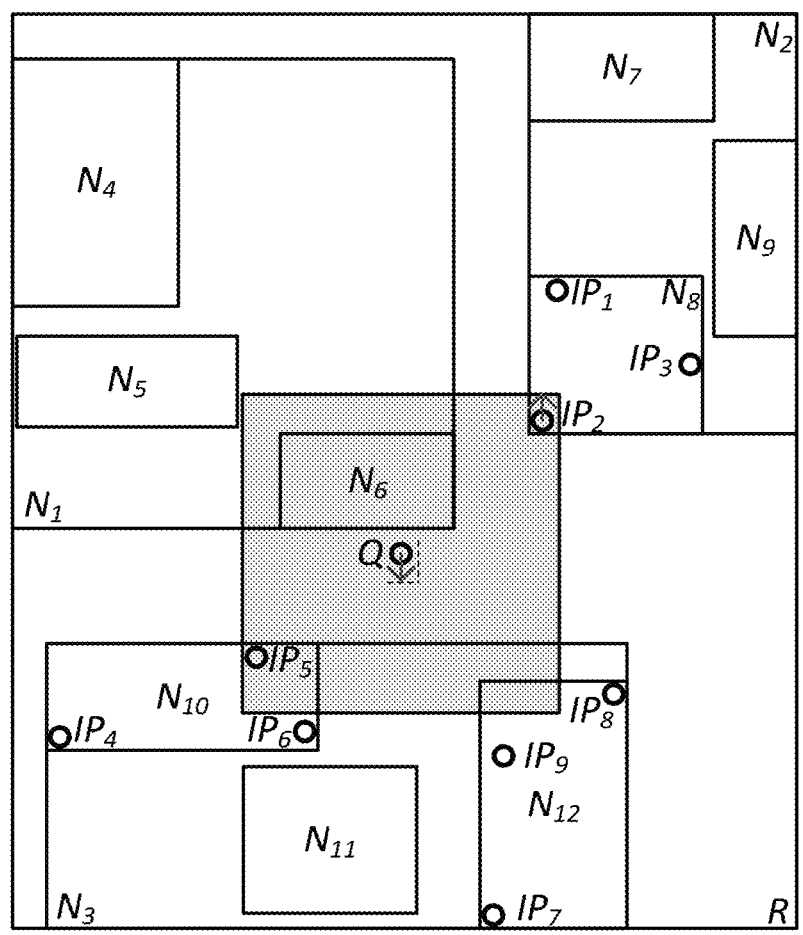
FIG. 6B is a diagram illustrating that the bottom side of a potential safe region will be a distance to the query point, Q, equal to the distance of the closest node, $IP_2$, to the top side of the query window.
Figure 6C:
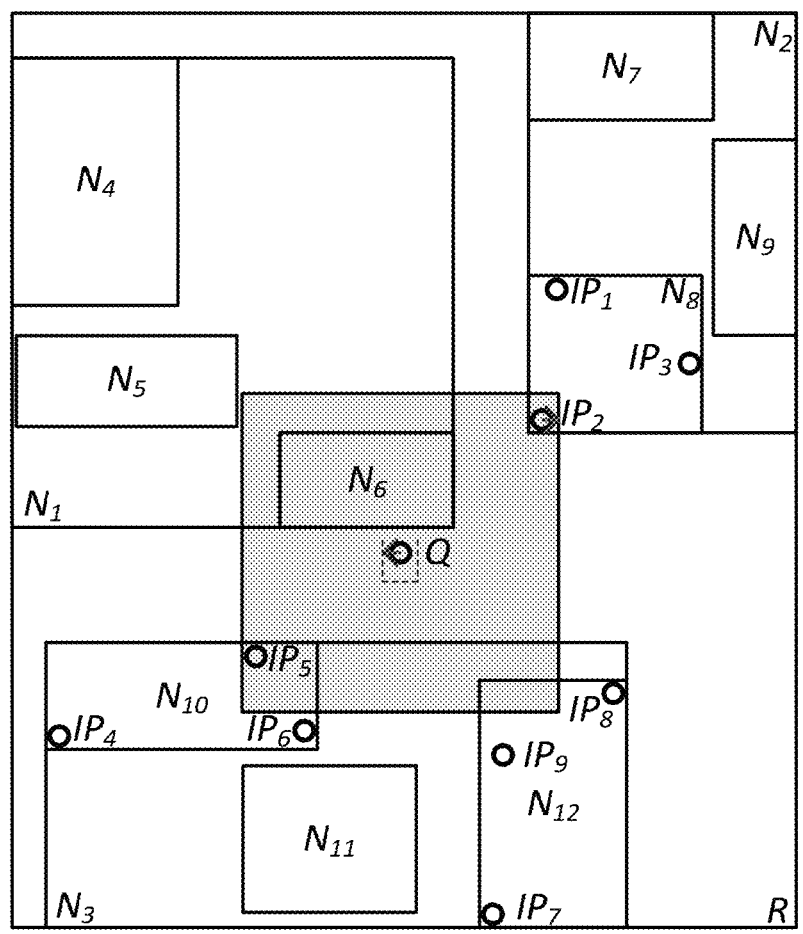
FIG. 6C is a diagram illustrating that the left side of a potential safe region will be a distance to the query point, Q, equal to the distance of the closest node, $IP_2$, to the right side of the query window.
Figure 6D:
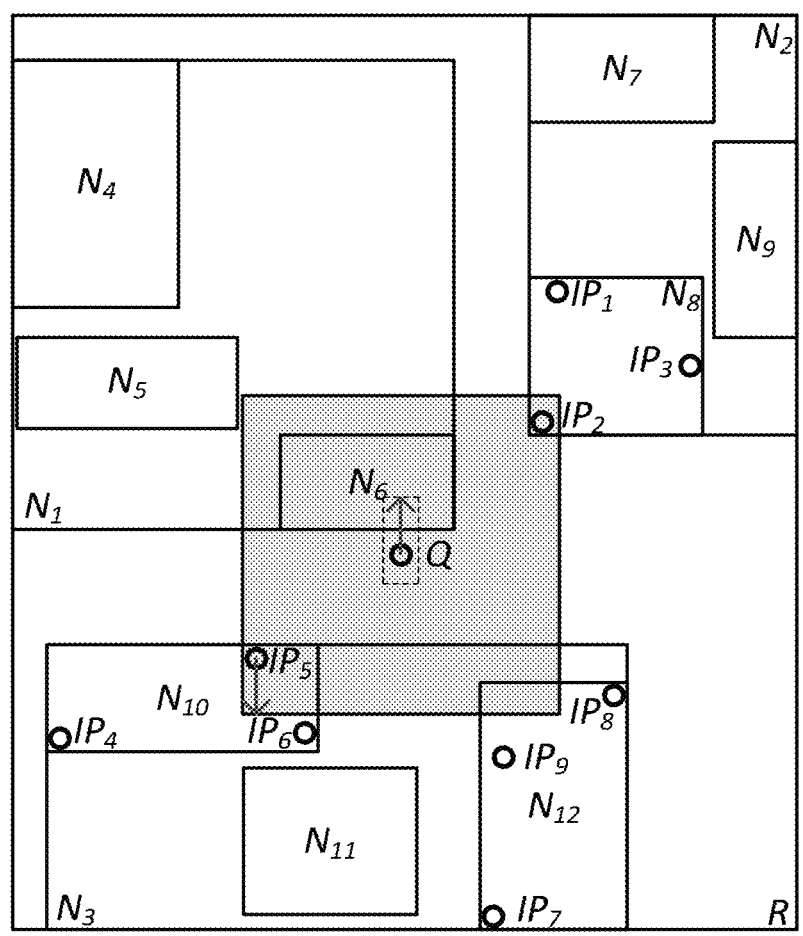
FIG. 6D is a diagram illustrating that the top side of a potential safe region will be a distance to the top of the query point, Q, equal to the distance of the closest node, $IP_5$, to the bottom side of the equal window.
Figure 6E:
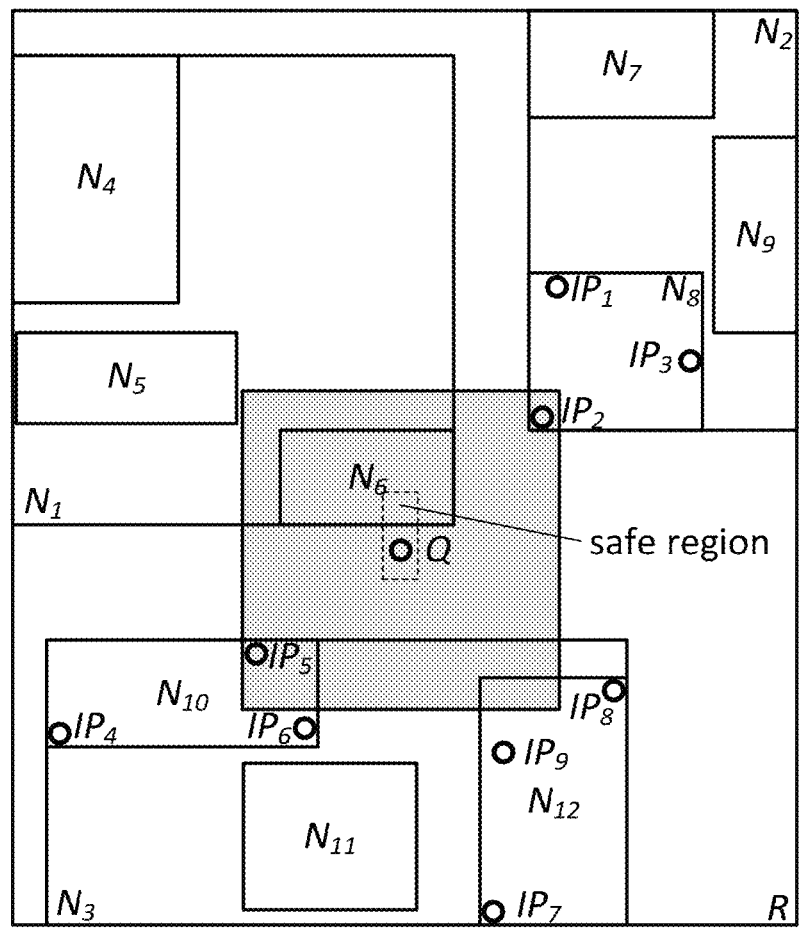
FIG. 6E is a diagram depicting a potential safe region within a query window.

The boundaries of the initial candidate safe region are computed by using the leaf nodes at the top of the directional heaps, such that the keys of the tops of the Left-Heap, Up-Heap, Right-Heap, and Down-Heap determine the right border, bottom border, left border, and top border, respectively. For example, the key of $IP_5$ in the Left-Heap may be 7 because it is 7 units away from the left border of the query window. The right border of the safe region is then 7 units right from the query point as illustrated in FIG. 6A in the red dashed line. The key of $IP_2$ in the Right-Heap may be 12 because it is 12 units away from the right border of the query window. The left border of the initial candidate safe region is then 12 units down of the query point as in FIG. 6B in the red dashed line. The left and top borders of the safe region are determined using the same methodology as shown in FIGS. 6C and 6D. The initial candidate safe region is shown in FIG. 6E in the dashed line.

After the initial candidate safe region is computed, the safe region can be continually refined by removing the areas of the safe region that are the intersections of the safe region and the Minkowski sums of uncovered leaf nodes. Uncovered leaf and internal nodes have been previously inserted into the Uncovered-Heap. The nearest uncovered node with respect to a query point can reside at the top of the heap. Nodes can be popped from the heap until the heap is empty. After every pop operation, if the popped node is an internal node and its Minkowski sum intersects the safe region, the node can be expanded and its children can be inserted into the Uncovered-Heap. If the node is a leaf node and its Minkowski sum intersects the safe region, the safe region can be refined. If the node's Minkowski sum does not intersect the safe region, the node can be discarded.

Figure 7A:
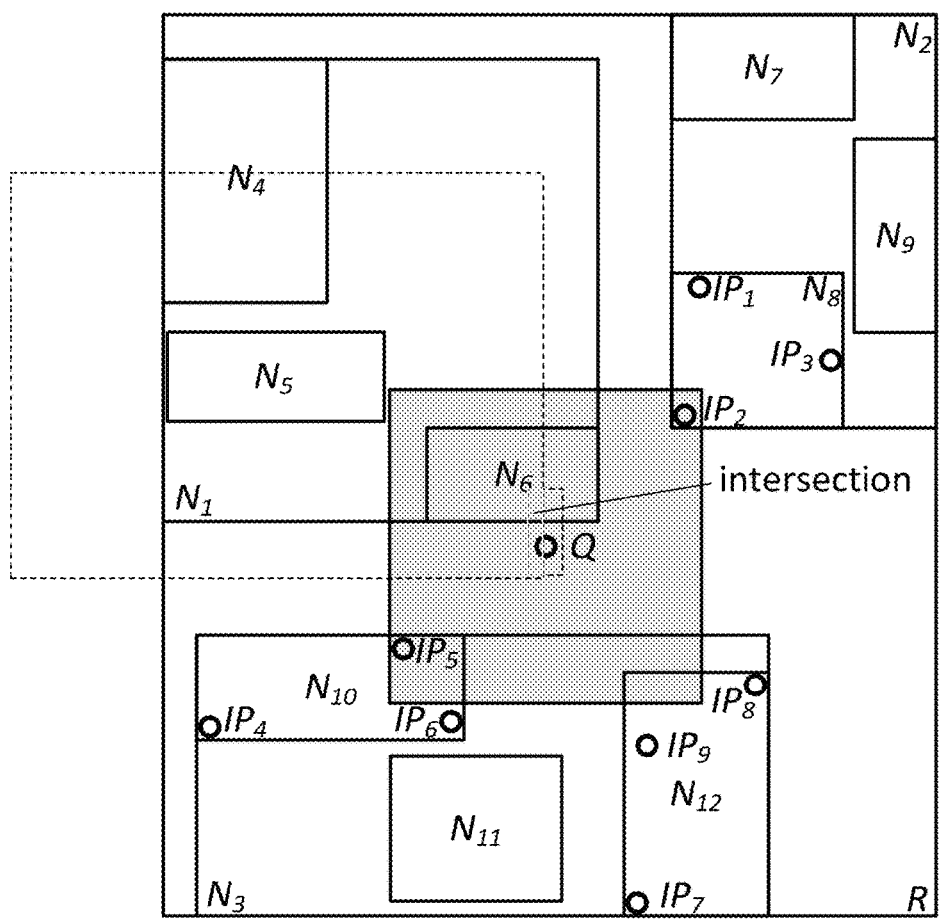
FIG. 7A is a diagram depicting the Minkowski sum of $N_5$ intersecting with the potential safe region.
Figure 7B:
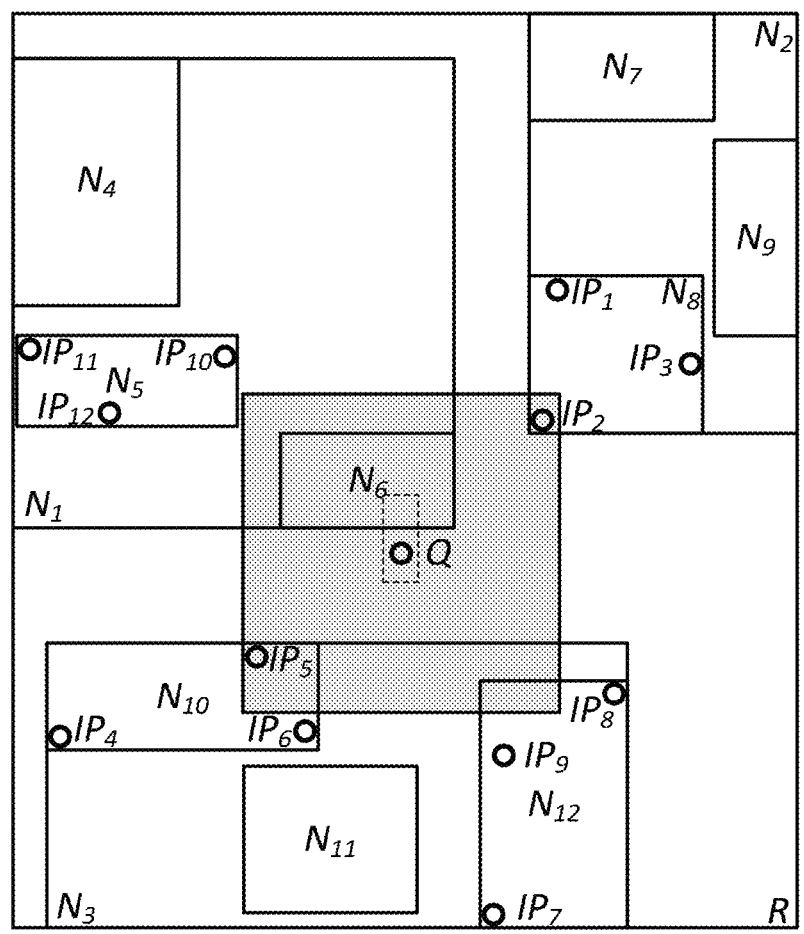
FIG. 7B is diagram depicting expanded Node $N_5$ to reveal $IP_{10}$-$IP_{12}$.
Figure 7C:
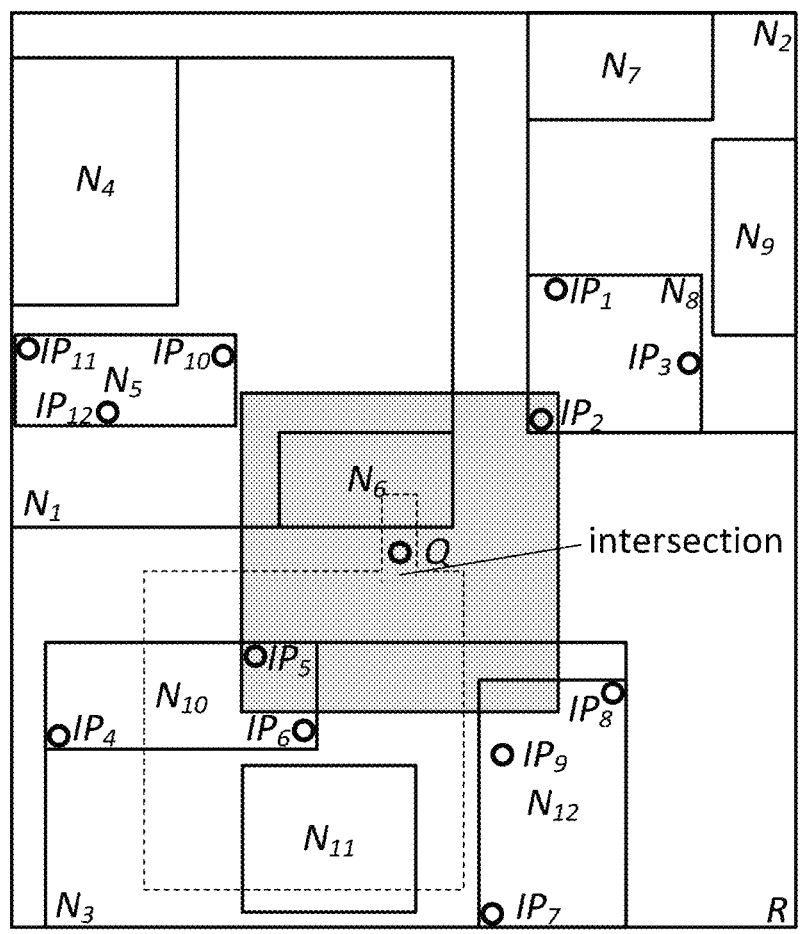
FIG. 7C is a diagram depicting a Minkowski sum of $IP_6$ intersecting with the potential safe region.
Figure 7D:
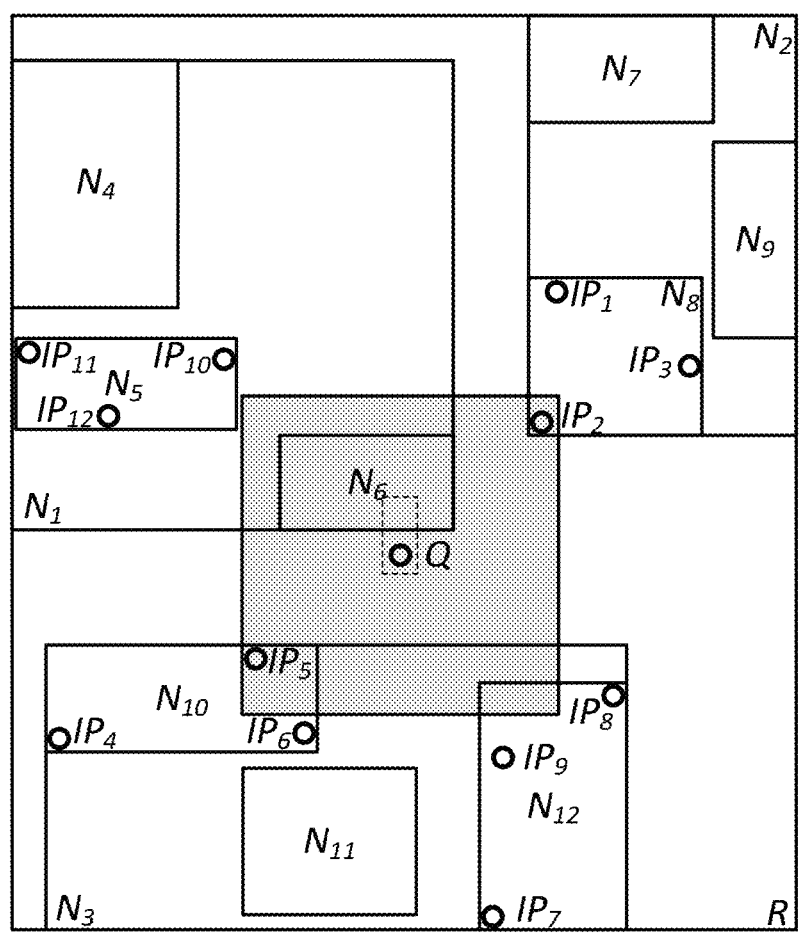
FIG. 7D is a diagram depicting a modified safe region in which the interaction of the Minkowksi sum of $IP_6$ and the safe region has been segmented off the potential safe region.
Figure 7E:
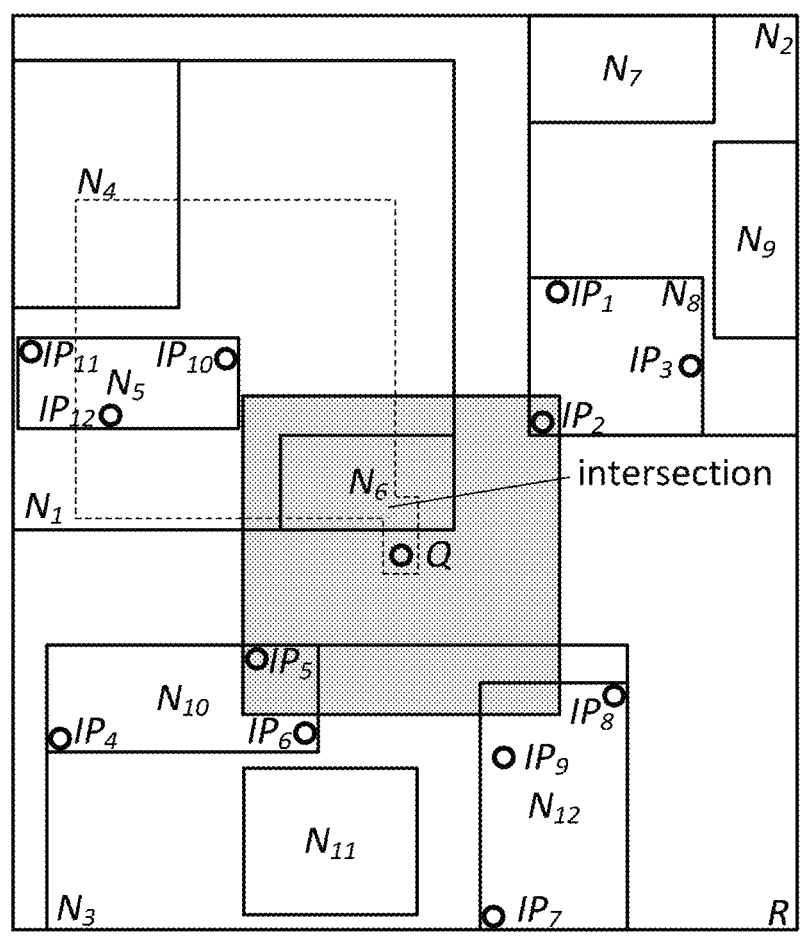
FIG. 7E is a diagram depicting a Minkowski sum of $IP_{10}$ intersecting with the potential safe region.
Figure 7F:
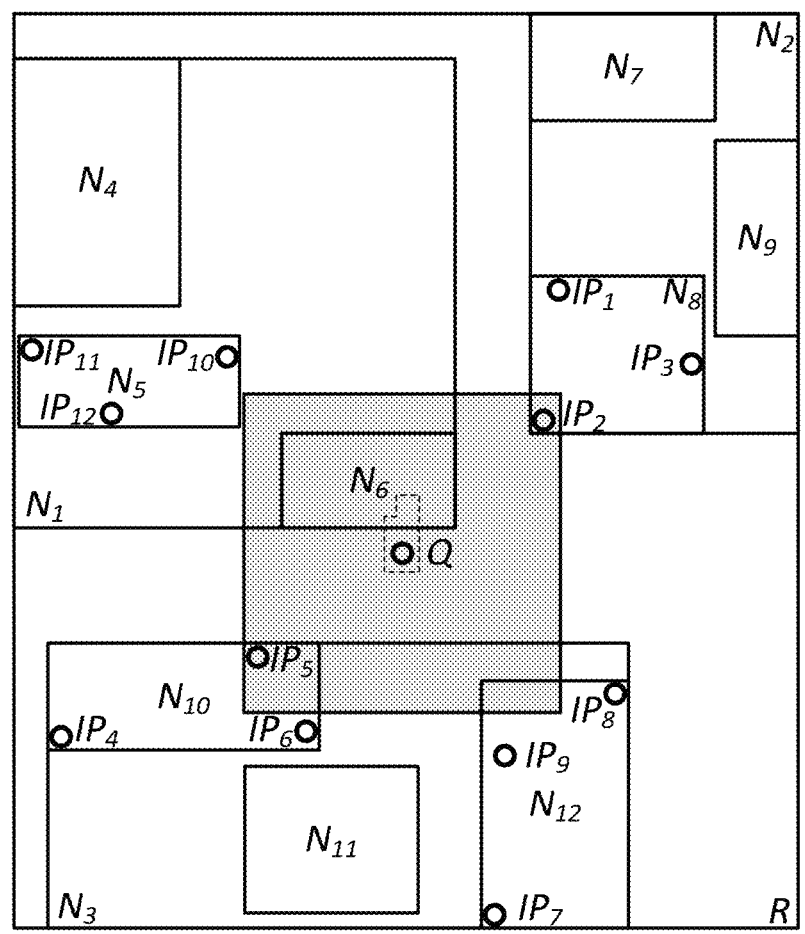
FIG. 7F is a diagram depicting a modified safe region in which the interaction of the Minkowksi sum of $IP_{10}$ and the safe region has been segmented off the modified safe region.
Figure 7G:
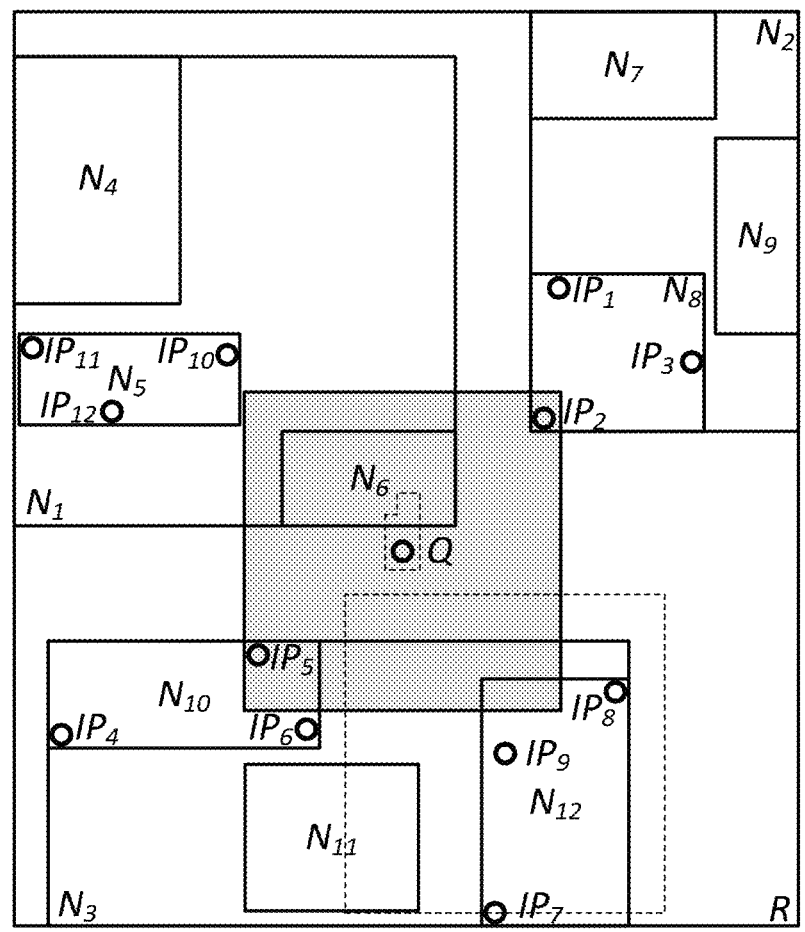
FIG. 7G is a diagram depicting a Minkowski sum of $IP_9$.
Figure 7H:
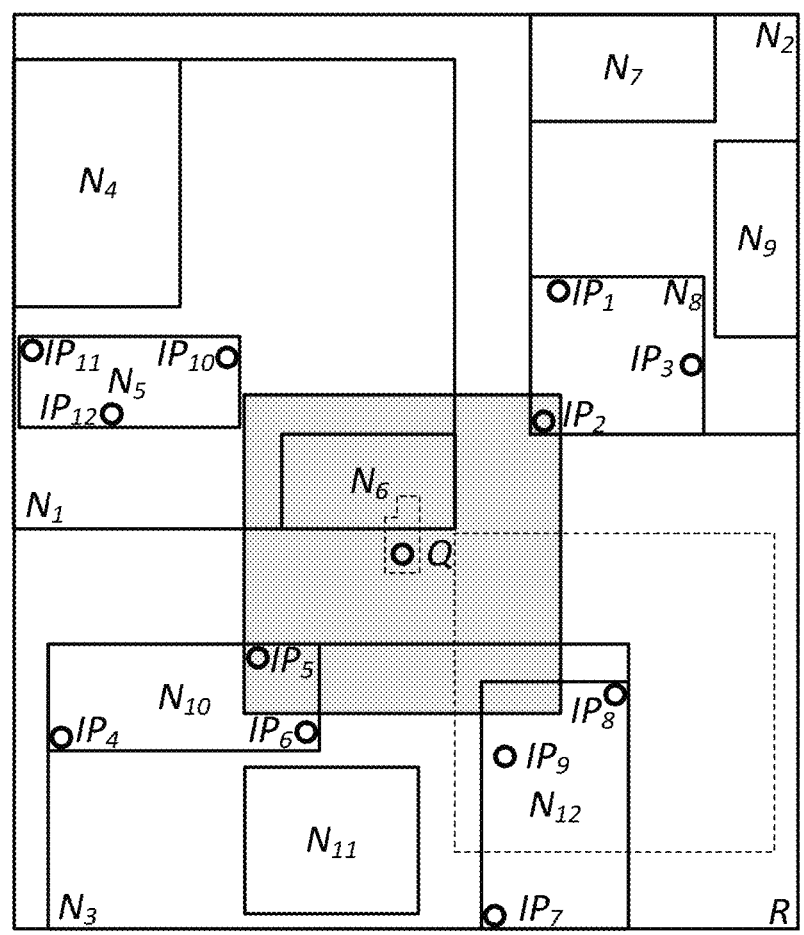
FIG. 7H is a diagram depicting a Minkowski sum of $IP_8$.
Figure 7I:
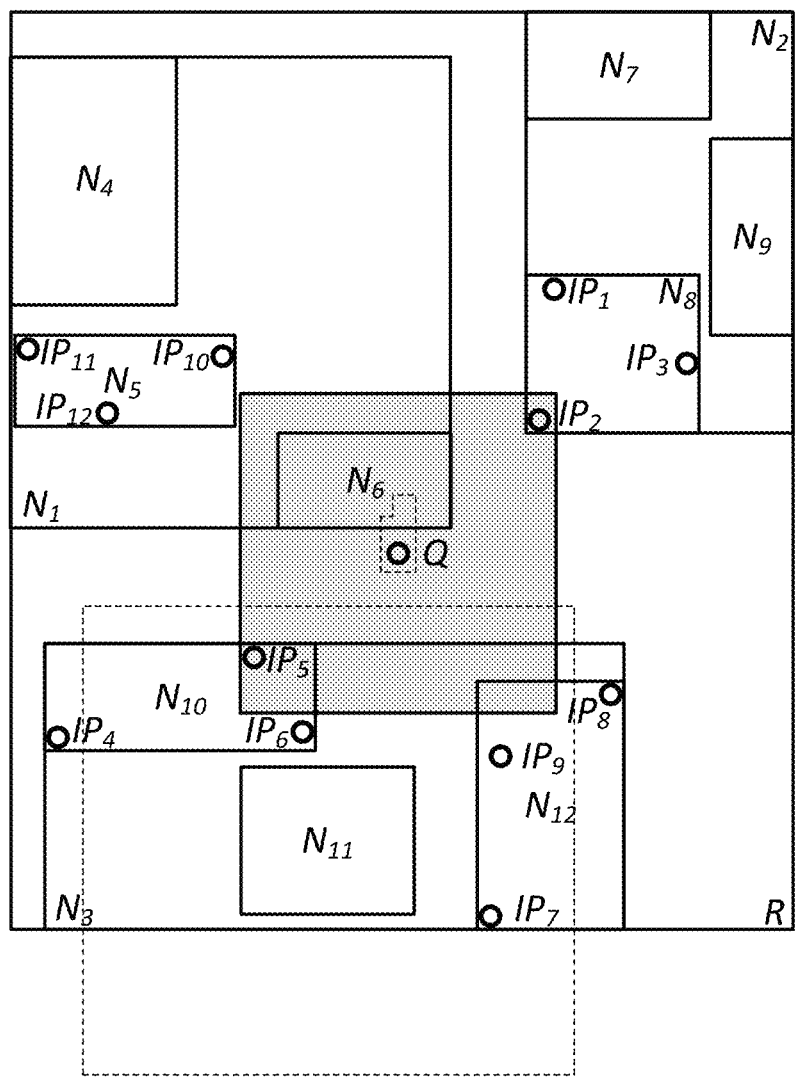
FIG. 7I is a diagram depicting a Minkowski sum of $N_{11}$.
Figure 7J:
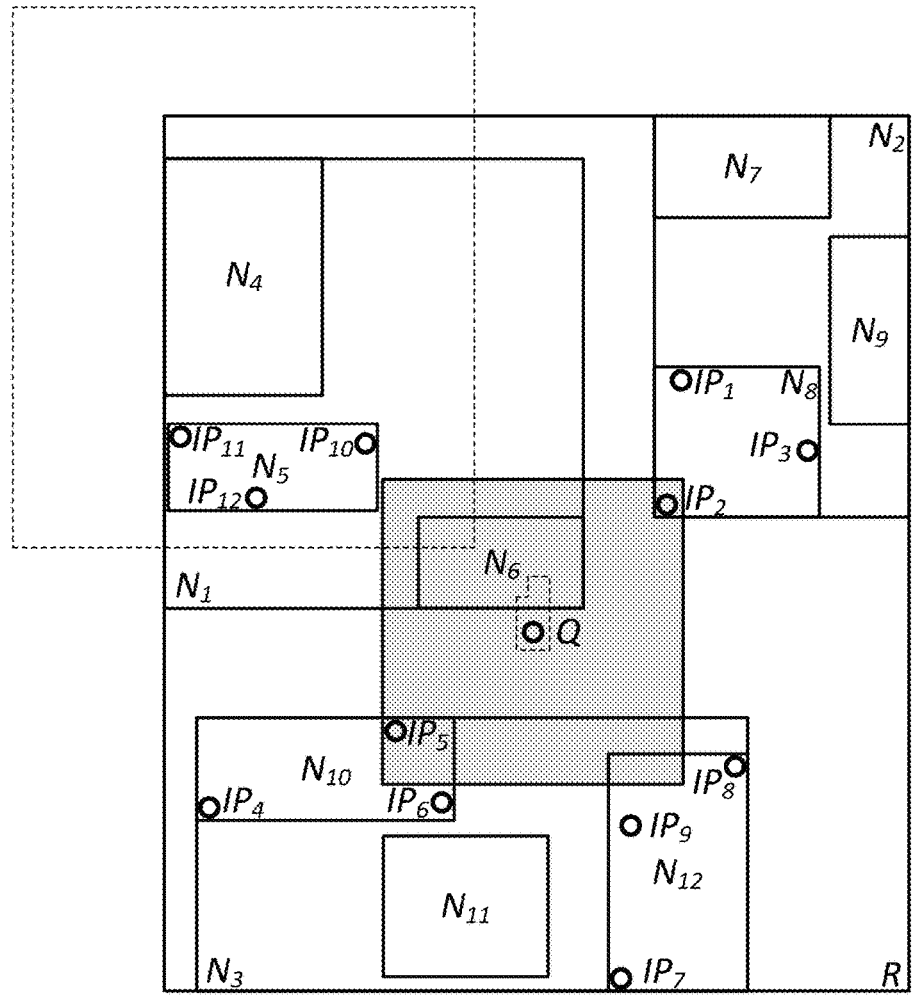
FIG. 7J is a diagram depicting a Minkowski sum of $N_4$.
Figure 7K:
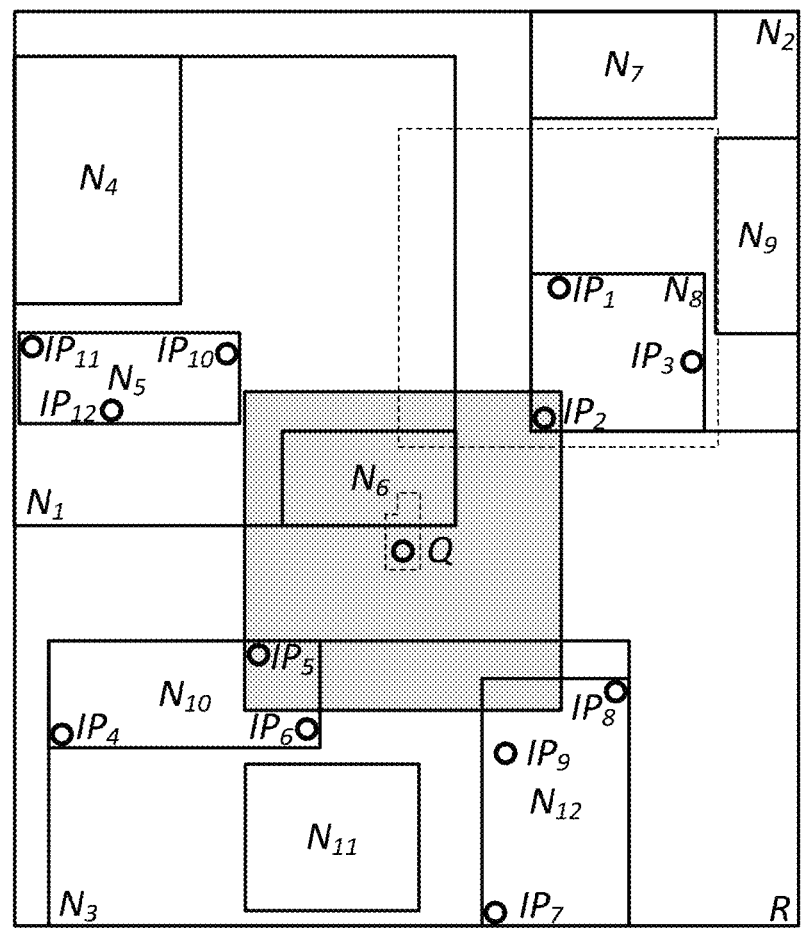
FIG. 7K is a diagram depicting a Minkowski sum of $IP_1$.
Figure 7L:
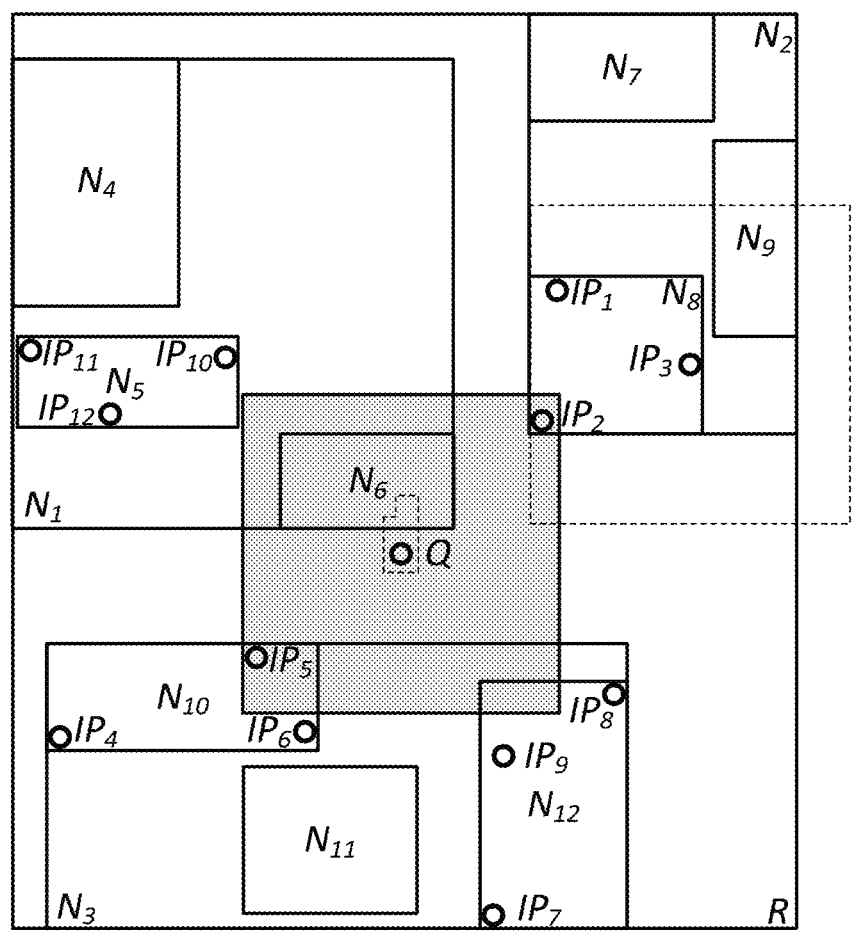
FIG. 7L is a diagram depicting a Minkowski sum of $IP_3$.
Figure 7M:
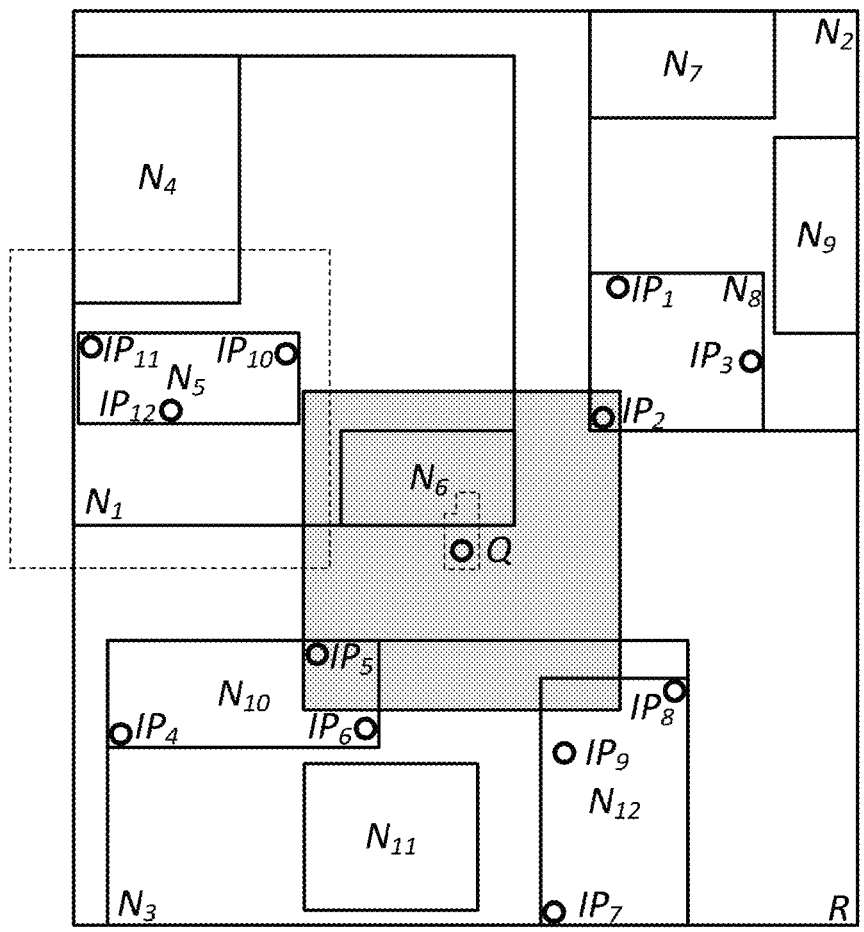
FIG. 7M is a diagram depicting a Minkowski sum of $IP_{12}$.
Figure 7N:
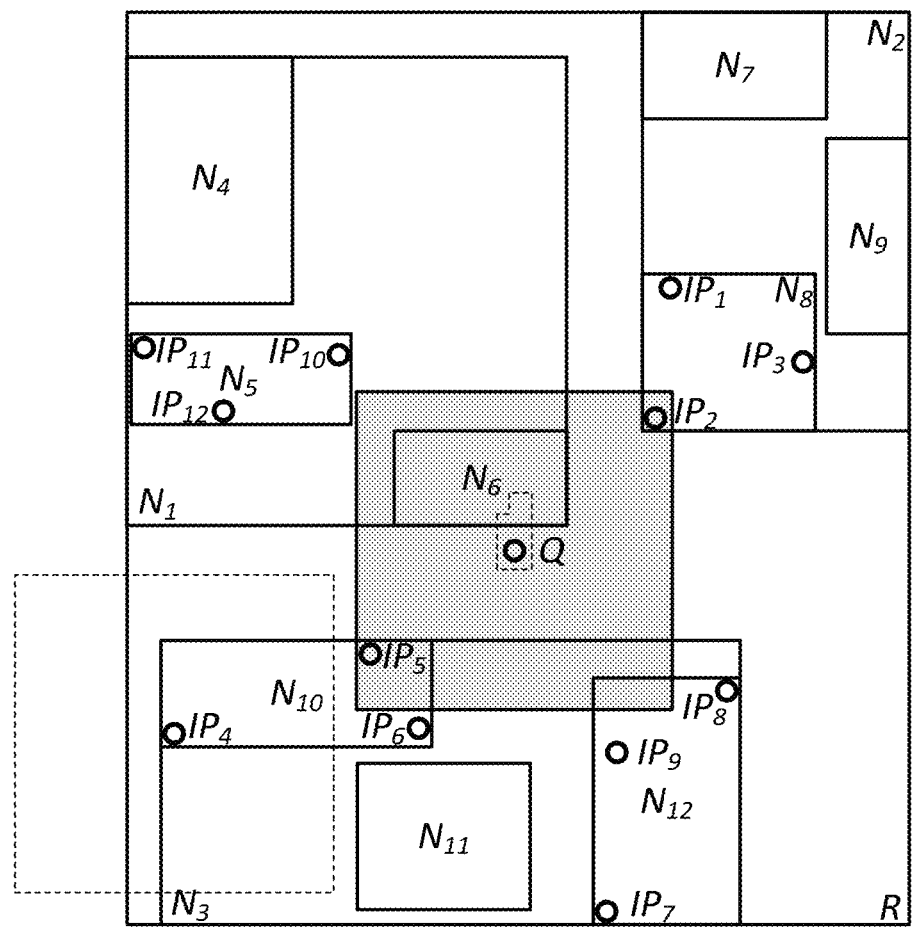
FIG. 7N is a diagram depicting a Minkowski sum of $IP_4$.
Figure 7O:
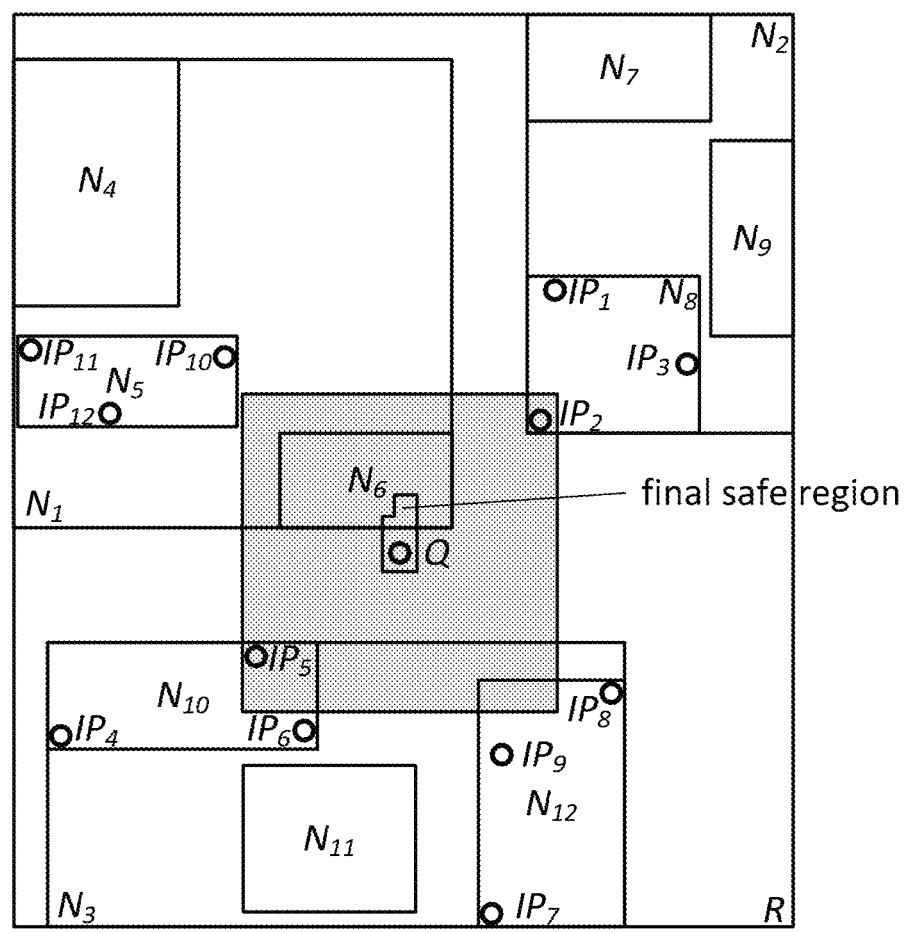
FIG. 7O is a diagram of the final safe region.
Figures 8, 9:
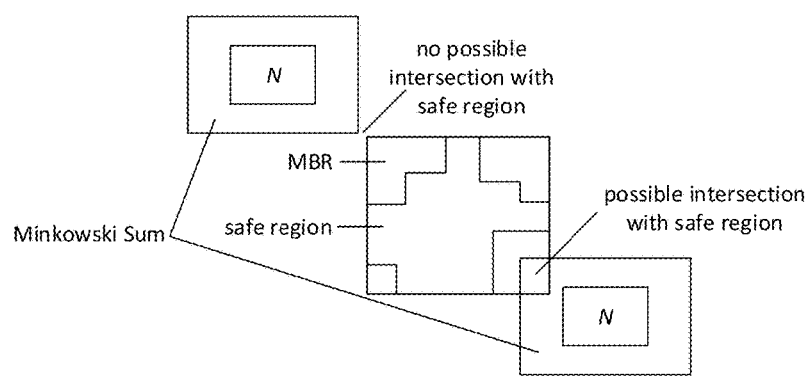
FIG. 8 illustrates an example of the contents of the data structures utilized in a Mobile Window Query.
FIG. 9 is a diagram of an optimization of detecting intersections with the safe region in a Mobile Window Query.

As seen in FIG. 7A, N5 is popped from the Uncovered-Heap. Since its Minkowski sum intersects the candidate safe region, it is expanded as in FIG. 7B, and its children nodes are inserted into the heap. $IP_6$ is popped from the heap. As in FIG. 7C, its Minkowski sum intersects the safe region. As $IP_6$ is a leaf node, the candidate safe region can be refined as seen in FIG. 7D. $IP_{10}$ can popped and as seen in FIG. 7E, $IP_{10}$'s Minkowski sum intersects the candidate safe region, so the candidate safe region is refined once more as seen FIG. 7F. $IP_9$ is popped and its Minkowski sum does not intersect the candidate safe region as in FIG. 7G, so it is discarded. $IP_8$ is popped and its Minkowski sum also does not intersect the candidate safe region as in FIG. 7H. Similarly, nodes $N_{11}$, $N_4$, $IP_1$, $IP_3$, $IP_{12}$, and $IP_4$ do not intersect the candidate safe region as in FIGS. 7I, 7J, 7K, 7L, 7M, and 7N, respectively. Although not shown in the Figures, the Minkowski sums of the uncovered nodes excluded from the foregoing list of nodes also do not intersect the safe region. As such nodes such as these are discarded and the Uncovered-Heap is now empty. The final safe region can be computed and returned, as seen in FIG. 7O.

Figure 4:
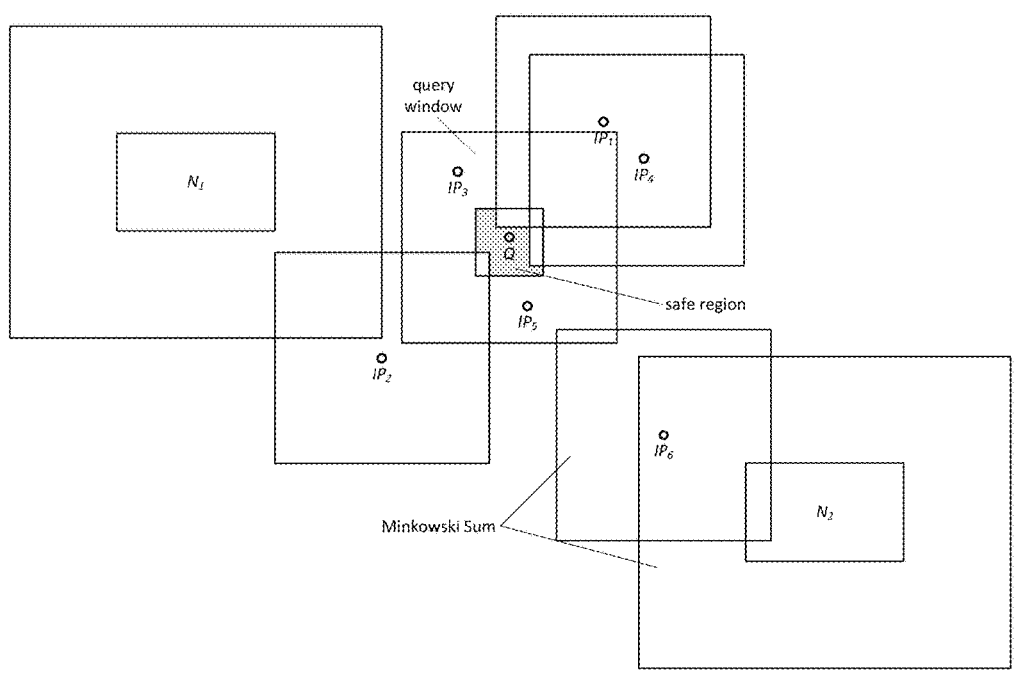
FIG. 4 is a diagram of a safe region within a query window in an embodiment of the subject invention.

Embodiments of the subject invention provide methods and systems that retrieve a window query result with a corresponding safe region, an area in which the query result remains the same with respect to a set of interest points as in FIG. 4. A tree-like data structure can be utilized to index a set of interest points, IP, and efficiently process a mobile window query, MWQ.

In certain embodiments of the subject invention, an R-tree can serve as a tree-like index, however the MWQ is not restricted to an R-Tree and can utilize other tree like index $IP_1$, $IP_2$, and $IP_4$. A MWQ can maintain four directional heaps, (left-heap, up-heap, right-heap, and down-heap), of tree nodes. Nodes that intersect with the window query are placed in these directional heaps. It should be appreciated by one of ordinary skill in the art that solution utilizing R-trees can be reached, which does not require the heaps.

Embodiments of the subject invention can maintain an additional min-heap of R-tree nodes, into which topmost nodes that do not intersect the query window are inserted into the min-heap. Given some condition c (e.g., fully covered by the query window), a topmost node in a tree-like index is a node that satisfies the following conditions: (a) satisfies c; (b) all of its children satisfy c; and (c) its parent does not satisfy c.

A potential safe zone can be created by marking heaps to determine distance and directional characteristics in relation a window query or other specified boundary. When the directional heaps have all been marked, i.e., said to be finished processing, potential safe region can be calculated. Additional min-heaps can be used to refine the potential safe region into the actual safe region. Although uncovered nodes, i.e., nodes that do not intersect the query window, are not part of the window query result, they can still affect the potential safe region as they may be a part of the query result when the query point moves x units toward some direction.

Figure 3:
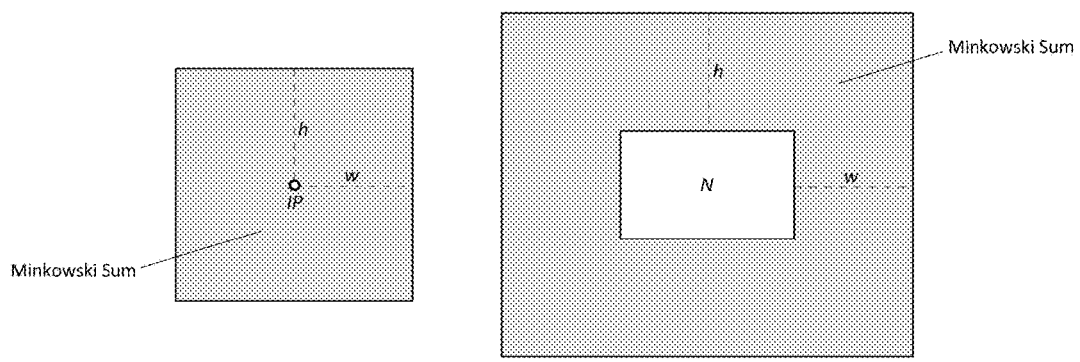
FIG. 3 is a diagram of the Minkowski sums of a leaf node and an internal node in a tree-like index.

Refinement of the potential safe region can comprise removing the area of intersection between the Minkowski sum of the uncovered interest points and the potential safe region from potential safe region, as seen in FIGS. 7A-7O. In the case of an R-tree-based MWQ, the height and width of the node are extended by the height and width of the query window to form the Minkowski sum as shown in FIG. 3. The refinement process is continually done until the additional min-heap is empty. The final safe region is no longer the potential safe region, but the actual safe region. The dimensions of the actual safe region can be no greater than the dimensions of the potential safe region.

Embodiments of the subject invention provide methods that can return a result even when no interest points are part of the query result. In this case, the safe region is the areas of the Minkowski sums of all uncovered interest points subtracted from the area of the universe. If the area of the universe is infinite, then the area of this special safe region is also infinite. Otherwise, the area of the special safe region is finite. The shape of the foregoing safe region can be prohibitively complex. In order to deal with this, a conservative safe region can be constructed. The shape of the conservative safe region can be described as a circle centered at the query point whose radius is equal to the distance to the query point's closest rectangular areas of the Minkowski sums of all uncovered interest points. The conservative safe region can be returned to the user and the window query result will not change as long as the user (or query point or moving object) stays within the conservative safe region. In the case of the conservative safe region, when the user exits the region, the client will need to repost the query, even though the results may still stay the same. This is because the safe region underestimates the area of the actual safe region.

Embodiments of the subject invention can return influential interest points to the user instead of returning safe regions. Influential interest points are interest points that contribute to the construction or refinement of the safe region; influential interest points may include two categories: inner interest point and outer interest point. An inner interest point resides within the query window while an outer interest point resides outside the query window. A set of interest points and their categories can be returned to a user. If at any point any of the statuses of interest points change while the query point is moving, e.g., an inner interest point becomes an outer interest point, or vice versa, the query results are invalidated, requiring another query post. However, if the status of the objects stays the same, the query result will not change. For demonstration purposes, the following will consider the retrieval of a safe region, although the herein disclosed method is also capable of retrieving a set of influential objects.

In certain embodiments of the subject invention, the MWQ methods and systems can return with the result set and the safe region (interest points) other data that may be derived from the result set. For example, location-based services may provide advertisements and recommendations along with the results. Implementations of MWQ may also return a modified result set with an internally applied filter or a result set that does not consist of interest points, but other data that is of relevance. Furthermore, the user may not be aware of the MWQ or its parameters.

Embodiments of the subject invention can maintain four min-heaps: Left-Heap (LH), Up-Heap (UH), Right-Heap (RH), and Down-Heap (DH), or directional heaps. Nodes that are covered by the query window are inserted into all four directional heaps. The order of the nodes in the directional heaps is maintained by their distance to their respective query window borders. The top of a given heap is the node that is closest to a distinct border of the query window. For example, the top of the Left-Heap is the leftmost node in the query window, i.e., it is the node inside the query window closest to the left border of the query window. It is important to note though that in the case of the R-tree, these heaps are not necessary.

Because of the bounding property of minimum bounded rectangles (MBRs) in R-trees, there is a tight bound around every node's underlying data. These bounding properties enable accurate determinations of one given nodes in the tree distance to a given window query's border over another given node.

A distance that can be used to maintain order in the directional min-heap can be stored with the node in the heap in order to perform a greedy approach. A greedy approach is one that solves problems by making the locally optimal choice at each step in hopes of finding a global optimum. Embodiments of the subject invention can maintain an additional min-heap, the uncovered-heap. The top of the heap is the node with the least distance to the query window. The key that is used to order the nodes in any of the aforementioned heaps is stored with the node data in the corresponding heap. For example, consider a node $N_1$ in the Left-Heap with a key 27, i.e., the query window fully covers $N_1$ and $N_1$ is 27 units from the query window. The key is stored with a pointer or reference to the node in the heap. Because $N_1$ exists in the Left-Heap, it must therefore exist in the other directional heaps, with possibly different keys for each heap.

In certain embodiments of the subject invention, the distance function used to maintain the order of nodes in the five foregoing heaps, can be a Tchebychev distance or maximum metric. The Tchebychev distance between two points is the maximum of the vertical and horizontal components and can be expressed as follows:

$$\max (|x_2-x_1|,|y_2-y_1|).$$

The Tchebychev distance between two nodes however, is the minimum Tchebychev distance between the two nodes.

Embodiments of the subject invention do not require specific technologies for deployment, in other words GPS, database, smartphone, smartphone application, nor are any of the technologies in the embodiments required for the present invention. Furthermore, the any combination of technologies can be utilized to provide positioning such as satellite, Bluetooth, Wi-Fi, mobile base stations, etc. Embodiments of the subject invention can be implemented locally, remotely, on an internet-enabled or non-internet-enabled personal computer (PC), server, smartphone, any device or equipment, or any combination of the above, via wired or wireless network connections.

Figure 10:
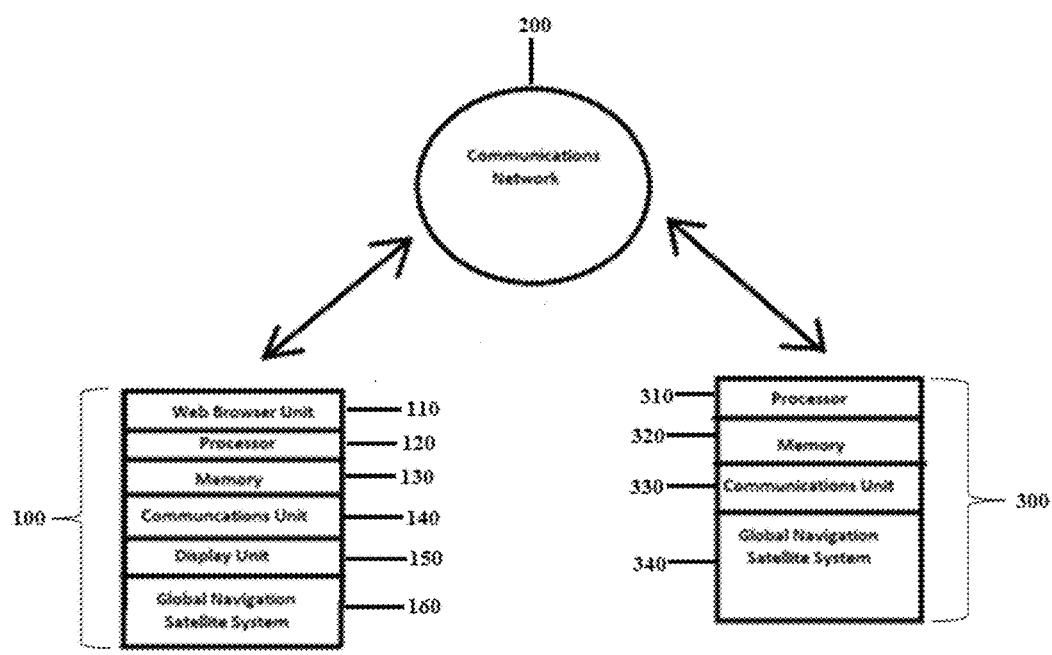
FIG. 10 is a diagram of a system that can be used to conduct a Mobile Widow Query according to an embodiment of the subject invention.

FIG. 10 shows an example of a system that may be used to implement features described above with reference to FIGS. 1-9. The system can include mobile device 100, a communications network 200, and a server 300. The mobile device 100 can include web browser unit 110, a processing unit 120, a memory device, 130, a communications unit, 140, a display unit, 150, and a Global Navigation Satellite Systems unit 160. The server 300 can include a processing unit, 310, a memory unit 320, a communications unit 330, and global navigation satellite system 340.

The memory device 130, 320 may be or include a device such as a Dynamic Random Access Memory (D-RAM), Static RAM (S-RAM), or other RAM or a flash memory. The communications network 200 can include, for example, a communications port, a wired transceiver, a wireless transceiver, and/or a network card. The communication network 200 may be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The display device 150 may be, for example, an in-dash display, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP).

According to embodiments of the subject invention, the computing device can be configured to perform any feature or any combination of features described above. Even though FIG. 10 shows that the mobile device and the server includes a single processor 120, 310, single memory device 130, 320, single communications unit 140, 330, single display unit 150, the system may include multiples of each or any combination of these components, and may be configured to perform, analogous functionality to that described above.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments:

Embodiment 1

A system for performing a window query, the system comprising:
a first (non-transitory) computer readable medium storing instructions, that when executed (e.g., by a processor) transmit a window query; and
a second (non-transitory) computer readable medium storing instructions, that when executed (e.g., by a processor) perform the following steps:
receive the window query;
generate a query window,
the first computer readable medium being located at the center of the rectangular shape;
retrieve a root node of a tree like index, the tree like index comprising a single root node connected to a plurality of nodes in a hierarchical structure, a predecessor of a node being a parent node, a descendant node being a child node, and in which a lowest node in the hierarchal structure being a leaf node;
expand the root node to reveal each of the child nodes of the root node;
determine which of the child nodes fall within the geographic boundaries of the query window;
expand each child node that falls within the geographic boundaries of the query window until each and every leaf node is revealed; and
demarcate a region.

Embodiment 2

The system according to embodiment 1, the demarcated region being an area inside of which the first computer readable medium will not re-transmit a window query until the first computer readable medium is outside the demarcated region.

Embodiment 3

The system according to any of embodiments 1-2, the instructions stored on the second computer readable medium, when executed, further performing the following step: returning a result to the first computer readable medium, the result comprising each leaf node contained with the window query and the demarcated region.

Embodiment 4

The system according to any of embodiments 1-3, nodes that fully fall outside the query window being inserted into an uncovered heap data structure.

Embodiment 5

The system according to any of embodiments 1-4, nodes that do intersect with the query window being inserted in directional heaps, the number of directional heaps correlating to the number of boundaries of the query window.

Embodiment 6

The system according to any of embodiments 1-5, the distance function used to maintain the order of nodes in the five foregoing heaps being a Tchebychev distance or maximum metric, the Tchebychev distance between two points being the maximum of the vertical and horizontal components, as follows:

$$\max(|x2-x1|,|y2-y1|).$$

Embodiment 7

The system according to any of embodiments 1-6, the demarcated region being created by designating the location of the first computer readable medium as a query point, determining a distance between a boundary of a query window and the closest leaf node that is also within the query window, expanding each side of the demarcated area a distance equal to the distance between the boundary of the query window and the closest leaf node in a direction opposite of the boundary of the query window, repeating measurement of the distance, and expanding the demarcated area for each boundary of the query window.

Embodiment 8

The system according to any of embodiments 1-7, the instructions stored on the second computer readable medium, when executed, further performing the following steps: generating a Minkowski sum of each node in the uncovered heap and determining which Minkowski sum intersects with the demarcated region.

Embodiment 9

The system according to any of embodiments 1-8, each node whose Minkowski sum intersects with the demarcated region being iteratively expanded to reveal the leaf nodes contained within the node.

Embodiment 10

The system according to any of embodiments 1-9, the instructions stored on the second computer readable medium, when executed, further performing the following step: generating a Minkowski sum of each leaf node contained in the node whose Minkowski sum intersects with the demarcated region and determining whether the Minkowski sum of the leaf node intersects with the demarcated region.

Embodiment 11

The system according to any of embodiments 1-10, the demarcated region being refined by taking each portion of the demarcated region that intersects with the Minkowski sum of the leaf nodes in the uncovered heap and removing said intersecting portion from the demarcated region in order to refine the demarcated region.

Embodiment 12

The system according to any of embodiments 1-11, the tree like index including an R-Tree, quad-Tree, K-D Tree, or any other tree-like index with a rectangular internal node area.

Embodiment 13

The system according to any of embodiments 1-12, a query point being a tuple of coordinates and representing an object in physical or virtual multidimensional space (for example, a person, an animal, a car, a plane, a smartphone, or a drone).

Embodiment 14

The system according to any of embodiments 1-13, the second computer readable medium being a server (e.g., a server that is wirelessly connected to the first computer readable medium).

Embodiment 15

The system according to any of embodiments 1-14, the first computer readable medium being a mobile phone, a tablet, or another mobile device.

Embodiment 16

The system according to any of embodiments 1-15, the second computer readable medium being a location aware device, in which data is stored on a local storage device directly connected to the second computer readable medium.

Embodiment 17

A method of performing a Mobile Window Query, the method comprising:
transmitting a window query;
generating a query window,
a (non-transitory) first computer readable medium being used to transmit the window query being located within the rectangular shape;
retrieving a root node of a tree like data structure, the tree like data structure comprising a single root node connected to a plurality of nodes in a hierarchical structure, a predecessor of a node being a parent node; a descendant node being a child node, and a lowest node in the hierarchal structure being a leaf node;
expanding the root node to reveal each the child nodes of the root node;
determining which of the child nodes fall within the geographic boundaries of the query window;
expanding each child node that falls within the geographic boundaries of the query window until each and every leaf node is revealed;
demarcating a region within the query window, the demarcated region being an area inside of which the first computer readable medium will not re-transmit a window query until the first computer readable medium is outside the demarcated region; and
returning a result to the first computer readable medium that includes each leaf node contained with the window query and the demarcated region.

Embodiment 18

The method of embodiment 17, nodes that fully fall outside the query window being inserted into an uncovered heap data structure.

Embodiment 19

The method according to any of embodiments 17-18, nodes fully fall inside the query window being inserted in 4 directional heaps.

Embodiment 20

The method according to any of embodiments 17-19, the demarcated region being created by designating the location of the first computer readable medium as a query point, determining a distance between a boundary of a query window and the closest leaf node that is also within the query window, and expanding each side of the demarcated area a distance equal to the distance between boundary of the query window and closest leaf node in a direction opposite of the boundary of the query window, Embodiment 21

The method according to embodiment 20, measurement distance and expansion of the demarcated area being repeated for each boundary of the query window.

Embodiment 22

The method according to any of embodiments 17-21, further comprising generating a Minkowski sum of each node in the uncovered heap and determining which Minkowski sum intersects with the demarcated region.

Embodiment 23

The method according to any of embodiments 17-22, each node whose Minkowski sum intersects with the demarcated region being iteratively expanded until the uncovered heap is empty to reveal the leaf nodes contained within the node.

Embodiment 24

The method according to any of embodiments 17-23, further comprising generating a Minkowski sum of each leaf node contained in the node whose Minkowski sum intersects with the demarcated region and determining whether the Minkowski sum of the leaf node intersects with the demarcated region.

Embodiment 25

The method according to any of embodiments 17-24, the demarcated region being refined by taking each portion of the demarcated region that intersects with the Minkowski sum of the leaf and removing said portion from the demarcated region in order to create the refined demarcated region.

Embodiment 26

The system according to any of embodiments 1-13, the second computer readable medium being a location-aware device, and data being stored on a local storage device directly connected to the second computer readable medium, the second computer readable medium being directly connected to the first computer readable medium.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 2:
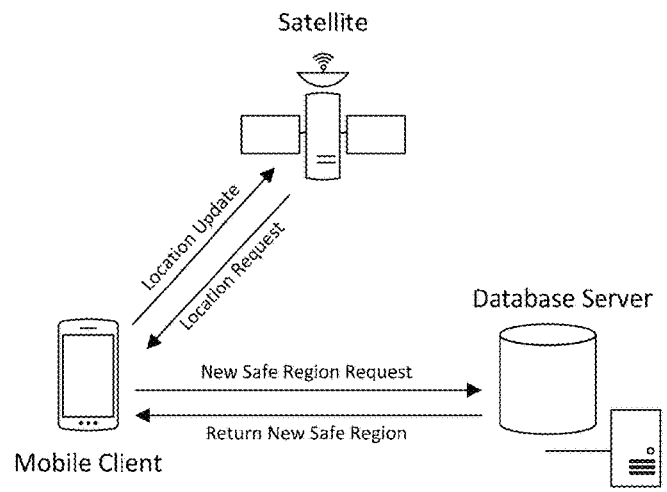
FIG. 2 is a diagram of a client-server paradigm utilized to process a Mobile Window Query (MWQ).

In the client-server model as in FIG. 2, the user post queries to the server that performs the computation of MWQs. Consider a user that is walking on a sidewalk. Through an application installed on his smartphone, the user is subscribed to a restaurant recommendation service. The recommendation service notifies the user of all restaurants that fall within a 1 mile×1 mile square window centered at his location. Conventional methods would induce the application to continuously monitor the smartphone's position and send multiple window queries to the server. However, embodiments of the subject invention will only require the application to transmit one window query request to the server.

It is assumed that the server processes the query in main-memory; however, in many use case examples, this is not necessarily true, i.e., the server may process the query on-disk or through some other storage medium. In fact, data objects may not even be stored in main-memory but in secondary memory. When the user's window query is posted to the server, the server processes the query and returns the window query result and the actual safe region to the user's smartphone. The user can continue to move within the actual safe region; without retransmitting the window query as long as the user remains in the actual safe region. If the user moves outside the actual safe region, the smartphone can transmit an updated window query to the server. The server can compute the new results and actual safe region, and return both to the user's smartphone.

Example 2

In the local computation model, there is no server. Instead, a location-aware device such as a GPS uses points of interest, e.g., shops stored on some local storage device, and processes window queries locally. Navigation systems such as GPS often have limited primary storage and processing power, rendering the computation of window query results whenever the device moves infeasible. As the windows queries are processed, and actual safe region can be determined locally. This eliminates the need to reprocess window queries whenever the device moves as the query results are guaranteed not to change.

A user can walk with a GPS device through a local mall. The user can post a window query to the device to determine the location of all clothing stores within a 200 meter×300 meter window centered at his location. The GPS device can process the window query locally and return the interest points within the query window and the safe region. As long as the user remains in the actual safe region, the GPS does not need to process any additional queries within this region, reducing processing costs and battery consumption on the GPS device. When Sam exits the safe region, the GPS must reprocess the window query, repeating the foregoing procedure.

Example 3

A user can walk into a market and use a Generic Brand A smartphone application to search for nearby Generic Brand A products. The mobile application can dynamically configure a local parameter that determines the size of the query window for a window query. The application can contact a remote server to post the MWQ. The server can return locations of nearby Generic Brand A products, advertisements and suggestions for Generic Brand A products, and interest points and their status. The application's user-friendly interface displays the aforementioned data on the smartphone screen. As long as the user remains within the actual safe zone, the mobile application will not have to retransmit another window query to the server.

Additionally, a user can subscribe to Generic Brand X and Generic Brand Y via a location-based service on a tablet, smartwatch, smartphone, or other smart devices. As the user walks in a mall, the service can send the push notifications to the smart about nearby stores that sell Generic Brand X and/or Generic Brand Y products.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] Nutanong, Sarana, et al. "The v*-diagram: a query-dependent approach to moving knn queries." Proceedings of the VLDB Endowment 1.1 (2008): 1095-1106.
[2] Li, Chuanwen, et al. "Processing moving k NN queries using influential neighbor sets." Proceedings of the VLDB Endowment 8.2 (2014): 113-124.
[3] Hasan, Mahady. "Efficient Algorithm to Monitor Continuous kNN Queries." *International Journal* 2.4 (2013).
[4] Cheema, Muhammad Aamir, et al. "Continuous monitoring of distance-based range queries." *IEEE Transactions on Knowledge and Data*.
[5] Nutanong, Sarana, et al. "Analysis and evaluation of v*-knn: an efficient algorithm for moving knn queries." *The VLDB Journal—The International Journal on Very Large Data Bases* 19.3 (2010): 307-332. Engineering 23.8 (2011): 1182-1199.
[6] Hasan, Mahady, et al. "Efficient construction of safe regions for moving knn queries over dynamic datasets." *International Symposium on Spatial and Temporal Databases*. Springer Berlin Heidelberg, 2009.
[7] Zhang, Jun, et al. "Location-based spatial queries." Proceedings of the 2003 ACM SIGMOD international conference on Management of data. ACM, 2003.
[8] Al-Khalidi, Haidar, et al. "Monitoring moving queries inside a safe region." *The Scientific World Journal* 2014 (2014).
[9] Haidar, AL-Khalidi, et al. "On finding safe regions for moving range queries." Mathematical and Computer Modelling 58.5 (2013): 1449-1458.
[10] Al-Khalidi, Haidar, et al. "Efficient Monitoring of Moving Mobile Device Range Queries using Dynamic Safe Regions." Proceedings of International Conference on Advances in Mobile Computing & Multimedia. ACM, 2013.
[11] Tao, Yufei, and Dimitris Papadias. "Time-parameterized queries in spatio-temporal databases." Proceedings of the 2002 ACM SIGMOD international conference on Management of data. ACM, 2002.

What is claimed is:
1. A system for performing a mobile window query, the system comprising:
a mobile computing device configured to transmit a user-initiated window query; and a second computer readable medium comprising stored instructions, that when executed cause at least one processor to:
receive the window query from the mobile computing device;
designate a location of the mobile computing device as a query point;
access a database of interest points, detect each interest point contained within a rectangular-shaped query window that is centered at the query point, and bind the interest points within the query window in a tree like index, each interest point of the interest points within the query window comprising a respective leaf node of the tree like index;
retrieve a root node of the tree like index, the tree like index comprising a single root node connected to a plurality of nodes in a hierarchical structure, each predecessor of a node being a parent node, each descendant node being a child node, and a lowest node in the hierarchal structure being a leaf node;
expand the root node to reveal each child node of the root node;
determine which of the child nodes fall within the query window;
expand each child node that intersects with the query window until each leaf node is revealed;
generate a demarcated region that surrounds the query point, the sides of the demarcated region being generated by respectively moving each side of the demarcated region outward from the query point towards a respective side of the query window based upon a distance between the respective side of the query window and an interest point that is within the query window and closest to the respective side of the query window;
transmit the demarcated region to the mobile computing device; and
return a result to the mobile computing device, the result comprising each interest point contained within the query window,
the mobile computing device comprising a first computer readable medium comprising stored instructions that when executed cause at least one processor to restrict retransmission of the window query until after the mobile computing device moves outside the demarcated region.

2. The system according to claim 1, the instructions stored on the second computer readable medium, when executed, further causing the at least one processor to insert nodes that fully fall outside of the query window into an uncovered heap data structure.

3. The system according to claim 2, the instructions stored on the second computer readable medium, when executed, further causing the at least one processor to insert respective nodes that fully fall inside the query window into 1 of 4 directional heaps.

4. The system according to claim of 3, the instructions stored on the second computer readable medium, when executed, further causing the at least one processor to:
generate the demarcated region by moving each respective side of the demarcated region outward from the query point towards a respective side of the query window a distance equal to a distance between the respective side of the query window and the interest point that is within the query window and closest to the respective side of the query window.

5. The system according to claim 4, the instructions stored on the second computer readable medium, when executed, further causing the at least one processor to generate a Minkowski sum of each node in the uncovered heap, and determine which Minkowski sum intersects with the demarcated region.

6. The system according to claim 5, the instructions stored on the second computer readable medium, when executed, further causing the at least one processor to expand each node whose Minkowski sum intersects with the demarcated region to reveal the child nodes contained within the node.

7. The system according to claim 6, the instructions stored on the second computer readable medium, when executed, further causing the at least one processor to:
generate a Minkowski sum of each child node contained in the node whose Minkowski sum intersects with the demarcated region;
determine whether the Minkowski sum of the child node intersects with the demarcated region; and
upon said positive determination, insert the child node back into the uncovered heap.

8. The system according to claim 7, the instructions stored on the second computer readable medium, when executed, further causing the at least one processor to refine the demarcated region by taking each portion of the demarcated region that intersects with the Minkowski sum of the leaf nodes and removing said intersecting portion from the demarcated region.

9. The system according to claim 8, the tree like index comprising an R-Tree, a Quad tree, a K-D Tree, or a tree-like index with a rectangular internal node area.

10. The system according to claim 8, the leaf node describing an object including: a gas station, a police station, a restaurant, a hotel, a shopping center, a supermarket, or an objective in a video game.

11. The system according to claim 8, the second computer readable medium being a server wirelessly connected to the mobile computing device.

12. The system according to claim 8, the second computer readable medium being a location-aware device, the location-aware device being directly connected to the mobile computing device.

13. A method of for performing a mobile window query, the method comprising:
receiving, by a receiving device, a single window query from a mobile computing device;
designating a location of the mobile computing device as a query point;
accessing a database of interest points, detecting each interest point contained within a rectangular-shaped query window that is centered at the query point, and binding the interest points within the query window in a tree like index, each interest point of the interest points within the query window comprising a respective leaf node of the tree like index;
retrieving a root node of the tree like index, the tree like index comprising a single root node connected to a plurality of nodes in a hierarchical structure, each predecessor of a node being a parent node, each descendant node being a child node, and a lowest node in the hierarchal structure being a leaf node;
expanding the root node to reveal each child node of the root node;
determining which of the child nodes fall within the query window;
expanding each child node that falls within the query window until each and every leaf node is revealed;

generating a demarcated region surrounding the query point, the sides of the demarcated region being generated by respectively moving each side of the demarcated region outward from the query point towards a respective side of the query window based upon a distance between the respective side of the query window and an interest point that is within the query window and closest to the respective side of the query window, the demarcated region being an area inside of which the mobile computing device will restrict retransmission of the window query until after the mobile computing device moves outside the demarcated region;

transmitting the demarcated region to the mobile computing device; and returning a result to the mobile computing device, the result comprising each interest point contained within the query window.

14. The method according to claim 13, further comprising inserting nodes that fully fall outside of the query window into an uncovered heap data structure.

15. The method according to claim 14, further comprising generating a Minkowski sum of each node in an uncovered heap and determining which Minkowski sum intersects with the demarcated region.

16. The method according to claim 15, each node whose Minkowski sum intersects with the demarcated region being expanded to reveal the child nodes contained within the node, and the method further comprising:

generating a Minkowski sum of each child node contained in the node whose Minkowski sum intersects with the demarcated region; and determining whether the Minkowski sum of the leaf node intersects with the demarcated region; and upon said positive determination, inserting the child node back into the uncovered heap.

17. The method according to claim 16, the demarcated region being refined by taking each portion of the demarcated region that intersects with the Minkowski sum of the leaf nodes and removing said portion from the demarcated region.

18. The method according to claim 13, further comprising inserting respective nodes that fully fall inside of the query window being inserted into 1 of 4 directional heaps.

19. The method according to claim 18, further comprising generating the demarcated region by moving each respective side of the demarcated region outward from the query point towards a respective side of the query window a distance equal to a distance between the respective side of the query window and the interest point that is within the query window and closest to the respective side of the query window.

20. A method of for performing a mobile window query, the method comprising:

receiving, by a receiving device, a single window query from a mobile computing device;

designate a location of the mobile computing device as a query point;

accessing a database of interest points, detecting each interest point contained within a rectangular-shaped query window that is centered at the query point, and binding the interest points within the query window in a tree like index, each interest point of the interest points within the query window comprising a respective leaf node of the tree like index;

retrieving a root node of the R-tree index, the R-tree index comprising a single root node connected to a plurality of nodes in a hierarchical structure, each predecessor of a node being a parent node, each descendant node being a child node, and a lowest node in the hierarchal structure being a leaf node;

expanding the root node to reveal each child node of the root node;

determining which of the child nodes fall within the query window;

expanding each child node that falls within the query window until each and every leaf node is revealed;

inserting nodes that fully fall outside of the query window into an uncovered heap data structure;

inserting respective nodes that are fully covered by the query window into a respective directional heap of a plurality of directional heaps, the number of directional heaps correlating to the number of sides of the query window;

generating a demarcated region that surrounds the query point, the sides of the demarcated region being generated by respectively moving each side of the demarcated region outward from the query point towards a respective side of the query window based upon a distance between the respective side of the query window and an interest point that is within the query window and closest to the respective side of the query window, the demarcated region being an area inside of which the mobile computing device will restrict retransmission of the window query until after the mobile computing device moves outside the demarcated region;

generating a Minkowski sum of each node in the uncovered heap and determining which Minkowski sum intersects with the demarcated region, each node whose Minkowski sum intersects with the demarcated region being expanded to reveal the leaf nodes contained within the node;

generating a Minkowski sum of each leaf node contained in the node whose Minkowski sum intersects with the demarcated region and determining whether the Minkowski sum of the leaf node intersects with the demarcated region, the demarcated region being refined by taking each portion of the demarcated region that intersects with the Minkowski sum of the leaf nodes in the uncovered heap and removing said portion from the demarcated region;

transmitting the refined demarcated re ion to the mobile computing device; and returning a result to the mobile computing device that includes each interest point contained within the query window.

* * * * *